United States Patent
Kikuchi et al.

(10) Patent No.: US 8,778,525 B2
(45) Date of Patent: Jul. 15, 2014

(54) MULTI-LAYER, MICROPOROUS POLYETHYLENE MEMBRANE, BATTERY SEPARATOR FORMED THEREBY AND BATTERY

(75) Inventors: Shintaro Kikuchi, Saitama (JP); Kotaro Takita, Nasushiobara (JP)

(73) Assignee: Toray Battery Separator Film Co., Ltd, Nasushiobara-shi, Tochigi (JP)

( * ) Notice: Subject to any disclaimer, the term of this patent is extended or adjusted under 35 U.S.C. 154(b) by 725 days.

(21) Appl. No.: 12/064,350

(22) PCT Filed: Aug. 24, 2006

(86) PCT No.: PCT/JP2006/316645
§ 371 (c)(1),
(2), (4) Date: Feb. 21, 2008

(87) PCT Pub. No.: WO2007/023918
PCT Pub. Date: Mar. 1, 2007

(65) Prior Publication Data
US 2009/0148761 A1     Jun. 11, 2009

(30) Foreign Application Priority Data

Aug. 25, 2005  (JP) ................................ 2005-244833
Aug. 25, 2005  (JP) ................................ 2005-244834

(51) Int. Cl.
*H01M 2/16*     (2006.01)

(52) U.S. Cl.
USPC ........................................................ 429/145

(58) Field of Classification Search
USPC .......................... 429/145; 428/315.5; 156/77
See application file for complete search history.

(56) References Cited

U.S. PATENT DOCUMENTS

| | | | |
|---|---|---|---|
| 5,691,047 A * | 11/1997 | Kurauchi et al. | .......... 428/315.7 |
| 5,984,957 A | 11/1999 | Laptewicz, Jr. et al. | |
| 6,180,280 B1 | 1/2001 | Spotnitz | |
| 6,228,505 B1 | 5/2001 | Agent et al. | |
| 6,534,166 B1 | 3/2003 | Pip et al. | |
| 2001/0017431 A1 | 8/2001 | Pip et al. | |
| 2002/0132107 A1 | 9/2002 | O'Brien et al. | |
| 2002/0136946 A1 | 9/2002 | Amatucci et al. | |
| 2005/0058823 A1 | 3/2005 | Funaoka et al. | |
| 2006/0103055 A1 | 5/2006 | Hoshuyama et al. | |

FOREIGN PATENT DOCUMENTS

| | | |
|---|---|---|
| JP | 2883726 B2 | 6/1992 |
| JP | 3235669 B2 | 9/1993 |
| JP | 3422496 B2 | 9/1993 |
| JP | 06-182918 A | 7/1994 |
| JP | 06-240036 A | 8/1994 |
| JP | 11-317212 A | 11/1999 |
| JP | 11-329390 A | 11/1999 |
| JP | 2001-162741 A | 6/2001 |
| JP | 2002-321323 A | 11/2002 |
| JP | 2003-105123 A | 4/2003 |
| JP | 2004-149637 A | 5/2004 |
| JP | 2004-161899 A | 6/2004 |
| WO | 99/48959 A1 | 9/1999 |
| WO | 00/20492 A1 | 4/2000 |
| WO | 03/035232 A1 | 5/2003 |

OTHER PUBLICATIONS

European Search Report dated Jun. 21, 2012 issued in European Patent Application No. 06796758.8.

* cited by examiner

*Primary Examiner* — Larry Thrower
(74) *Attorney, Agent, or Firm* — Sughrue Mion, PLLC

(57) ABSTRACT

A multi-layer, microporous polyethylene membrane comprising (a) a first microporous layer made of a polyethylene resin, and (b) a second microporous layer comprising a polyethylene resin, and a heat-resistant polymer having a melting point or a glass transition temperature of 170° C. or higher, the heat-resistant polymer being dispersed in the form of fine particles in the polyethylene resin, and the second microporous layer having pores containing fine particles of the heat-resistant polymer as nuclei from which the cleavage of polyethylene resin fibrils starts, the multi-layer microporous polyethylene membrane having well-balanced shutdown properties, meltdown properties, permeability, mechanical strength, heat shrinkage resistance and compression resistance.

5 Claims, No Drawings

MULTI-LAYER, MICROPOROUS POLYETHYLENE MEMBRANE, BATTERY SEPARATOR FORMED THEREBY AND BATTERY

CROSS REFERENCE TO RELATED APPLICATIONS

This application is a National Stage of International Application No. PCT/JP2006/316645 filed on Aug. 24, 2006, claiming priority based on Japanese Patent Applications Nos. 2005-244833 and 2005-244834, filed Aug. 25, 2005, the contents of all of which are incorporated herein by reference in their entirety.

FIELD OF THE INVENTION

This invention relates to a multi-layer, microporous polyethylene membrane comprising a layer containing a polyethylene resin and a heat-resistant polymer other than polypropylene, and having well-balanced shutdown properties, meltdown properties, permeability, mechanical strength, heat shrinkage resistance and compression resistance, a battery separator formed by such multi-layer, microporous polyethylene membrane, and a battery comprising such separator.

BACKGROUND OF THE INVENTION

Microporous polyolefin membranes are widely used in separators for lithium batteries, etc., electrolytic capacitor separators, steam-permeable, waterproof clothing, various filters, etc. When the microporous polyolefin membranes are used as battery separators, their performance largely affects the performance, productivity and safety of batteries. Particularly lithium ion battery separators are required to have not only excellent mechanical properties and permeability but also shutdown properties and pore-closing function for stopping a battery reaction at the time of abnormal heat generation, thereby preventing the heat generation, ignition and explosion of the battery, which can be caused by the short-circuiting of external circuits, overcharge, etc.; heat shrinkage resistance, a function of keeping a separator shape to avoid a direct reaction between a cathode material and an anode material even when becoming high temperatures; etc.

In general, microporous membranes made only of polyethylene have low meltdown temperatures, while microporous membranes made only of polypropylene have high shutdown temperatures. Thus proposed is a battery separator formed by a microporous membrane made of polyethylene and polypropylene as main components.

Japanese Patent 3235669, for instance, discloses a battery separator having excellent heat shrinkage resistance and shutdown properties, which comprises at least one first layer made of a polymer selected from low-density polyethylene, an ethylene-butene copolymer and an ethylene-hexene copolymer, and at least one second layer made of a polymer selected from high-density polyethylene, ultra-high-molecular-weight polyethylene and polypropylene.

Japanese Patent 3422496 discloses a battery separator having excellent shutdown properties, which comprises at least one first layer made of a polymer selected from ethylene-butene copolymers, ethylene-hexene copolymers, ethylene-methacrylate copolymers and polyethylene, and at least one second layer made of a polymer selected from polyethylene and polypropylene.

Japanese Patent 2883726 discloses a battery separator having excellent shutdown properties and meltdown properties, which is obtained by simultaneously extruding polypropylene having a melting point of 150° C. or higher and polyethylene having a melting point of 100 to 140° C., monoaxially stretching the resultant laminate film at a temperature in a range from −20° C. to the melting point ($Tm_0$) of polyethylene −30° C., and further stretching it in the same direction at a temperature in a range from $Tm_0$ −30° C. to $Tm_0$ −2° C. to make it porous.

JP 11-329390 A proposes a battery separator having excellent shutdown properties and strength, which is formed by a microporous membrane comprising two high-strength, microporous polypropylene layers, and a filler-containing, shutting polyethylene layer, which is sandwiched by the polypropylene layers, the filler-containing, shutting polyethylene layer being produced by a method of stretching a particles-containing film.

As a microporous polyolefin membrane having excellent safety and strength, JP 2002-321323 A proposes a microporous polyolefin membrane obtained by integrally laminating a microporous membrane A comprising polyethylene and polypropylene as indispensable components, and a microporous polyethylene membrane B, in a three-layer structure of A/B/A or B/A/B.

However, polypropylene-containing microporous membranes have poor permeability and pin puncture strength. In addition, recently gaining importance as separator characteristics are not only permeability and mechanical strength, but also battery life characteristics such as cycle characteristics and battery productivity such as electrolytic solution absorbability. Particularly a lithium ion battery electrode expands by the intrusion of lithium when charged, and shrinks by the departure of lithium when discharged, an expansion ratio when charged tending to become larger as recent increase in the capacity of batteries. Because a separator is compressed when the electrode expands, the separator is required to suffer only small permeability variation by compression and have deformability to absorb the expansion of an electrode. However, each microporous membrane described in the above references does not have sufficient compression resistance. A microporous membrane with poor compression resistance is highly likely to provide batteries with insufficient capacity (poor cycle characteristics) when used as a separator.

Thus, the applicant proposed a microporous membrane comprising a polyolefin and a thermoplastic resin other than a polyolefin (for instance, polybutylene terephthalate), fine particles of 1 to 10 μm in diameter based on the thermoplastic resin other than the polyolefin being dispersed in the polyolefin, in which fibrils are cleft with the fine particles as nuclei, thereby forming creased gaps constituting pores containing the fine particles (JP 2004-149637 A). The applicant also proposed a microporous membrane comprising (a) polyethylene, and (b) a thermoplastic resin other than polyethylene (for instance, polymethylpentene-1) having a melting point or a glass transition temperature of 170 to 300° C., which is not completely dissolved but finely dispersed when melt-blended with polyethylene and its solvent, the air permeability increase of the microporous membrane by heat compression at a pressure of 5 MPa and 90° C. for 5 minutes being 500 seconds/100 cm$^3$ or more (JP 2004-161899 A). However, each of the microporous membranes described in these references does not have satisfactory mechanical properties and shutdown speed, with small deformation when compressed.

Accordingly desired is a microporous polyethylene membrane for battery separators, which has a layer comprising a polyethylene resin and a heat-resistant polymer other than polypropylene, so that it has well-balanced shutdown properties, meltdown properties, permeability, mechanical strength, heat shrinkage resistance and compression resistance.

OBJECT OF THE INVENTION

Accordingly, an object of this invention is to provide a multi-layer, microporous polyethylene membrane having a layer comprising a polyethylene resin and a heat-resistant polymer other than polypropylene, so that it has well-balanced shutdown properties, meltdown properties, permeability, mechanical strength, heat shrinkage resistance and compression resistance, a battery separator formed by such multi-layer, microporous polyethylene membrane, and a battery comprising such separator.

DISCLOSURE OF THE INVENTION

As a result of intense research in view of the above object, the inventors have found that the lamination of a microporous layer made of a polyethylene resin, and a microporous layer comprising a polyethylene resin and a heat-resistant polymer having a melting point or a glass transition temperature of 170° C. or higher provides a multi-layer, microporous polyethylene membrane having well-balanced shutdown properties, meltdown properties, permeability, mechanical strength, heat shrinkage resistance and compression resistance. This invention has been completed based on such finding.

Thus, the first multi-layer, microporous polyethylene membrane of this invention comprises (a) a first microporous layer made of a polyethylene resin, and (b) a second microporous layer comprising a polyethylene resin, and a heat-resistant polymer having a melting point or a glass transition temperature of 170° C. or higher, the heat-resistant polymer being dispersed in the form of fine particles in the polyethylene resin, and the second microporous layer having pores containing fine particles of the heat-resistant polymer as nuclei from which the cleavage of polyethylene resin fibrils starts.

The second multi-layer, microporous polyethylene membrane of this invention comprises (a) a first microporous layer made of a polyethylene resin, and (b) a second microporous layer comprising a polyethylene resin, and a heat-resistant polymer having a melting point or a glass transition temperature of 170° C. or higher, the heat-resistant polymer being dispersed in the form of fine particles in the polyethylene resin, and the air permeability increase by heat compression at a temperature of 90° C. and a pressure of 2.2 to 5 MPa for 5 minutes being 500 seconds/100 cm$^3$ or less.

The first method of this invention for producing a multi-layer, microporous polyethylene membrane comprises the steps of (1) melt-blending a polyethylene resin and a membrane-forming solvent to prepare a first melt blend, and melt-blending a polyethylene resin, a heat-resistant polymer having a melting point or a glass transition temperature of 170° C. or higher, and a membrane-forming solvent to prepare a second melt blend, (2) separately extruding the first and second melt blends through dies, (3) cooling the resultant extrudates to provide gel-like sheets, (4) stretching each gel-like sheet, (5) removing the membrane-forming solvent, and (6) laminating the resultant microporous membranes.

The second method of this invention for producing a multi-layer, microporous polyethylene membrane comprises the steps of (1) melt-blending a polyethylene resin and a membrane-forming solvent to prepare a first melt blend, and melt-blending a polyethylene resin, a heat-resistant polymer having a melting point or a glass transition temperature of 170° C. or higher, and a membrane-forming solvent to prepare a second melt blend, (2) simultaneously extruding the first and second melt blends through a die, (3) cooling the resultant laminar extrudate to provide a multi-layer, gel-like sheet, (4) stretching the multi-layer, gel-like sheet, and (5) removing the membrane-forming solvent.

The battery separator of this invention is formed by the above multi-layer, microporous polyethylene membrane. The battery of this invention comprises such battery separator.

DESCRIPTION OF THE PREFERRED EMBODIMENTS

[1] Polyethylene Resin

The polyethylene resin forming the first microporous layer in the multi-layer, microporous polyethylene membrane, which may be called simply "multi-layer, microporous membrane," is (a) ultra-high-molecular-weight polyethylene, (b) polyethylene other than ultra-high-molecular-weight polyethylene, (c) a mixture of the ultra-high-molecular-weight polyethylene with the other polyethylene (polyethylene composition), or (d) a mixture of any one of the ultra-high-molecular-weight polyethylene, polyethylene other than ultra-high-molecular-weight polyethylene and the polyethylene composition, with a polyolefin other than polyethylene (polyolefin composition). In any case, the mass-average molecular weight (Mw) of the polyethylene resin is preferably $1 \times 10^4$ to $1 \times 10^7$, more preferably $5 \times 10^4$ to $15 \times 10^6$, particularly $1 \times 10^5$ to $5 \times 10^6$, through not particularly limited. When the Mw of the polyethylene resin is $15 \times 10^6$ or less, melt extrusion can be easily conducted.

(a) Ultra-High-Molecular-Weight Polyethylene

The ultra-high-molecular-weight polyethylene has Mw of $5 \times 10^5$ or more. The ultra-high-molecular-weight polyethylene can be not only an ethylene homopolymer, but also an ethylene-α-olefin copolymer containing a small amount of other α-olefin(s). The other α-olefins than ethylene are preferably propylene, butene-1, pentene-1, hexene-1, 4-methyl-pentene-1, octene, vinyl acetate, methyl methacrylate, and styrene. The Mw of the ultra-high-molecular-weight polyethylene is preferably $1 \times 10^6$ to $15 \times 10^6$, more preferably $1 \times 10^6$ to $5 \times 10^6$. Not only one type of ultra-high-molecular-weight polyethylene, but also a mixture of two or more ultra-high-molecular-weight polyethylenes can be used. The mixture can be, for instance, a mixture of two or more ultra-high-molecular-weight polyethylenes having different Mws.

(b) Polyethylene Other than Ultra-High-Molecular-Weight Polyethylene

The polyethylene other than the ultra-high-molecular-weight polyethylene has Mw of $1 \times 10^4$ or more and less than $5 \times 10^5$, preferably being at least one selected from the group consisting of high-density polyethylene, intermediate-density polyethylene, branched low-density polyethylene and linear low-density polyethylene, more preferably high-density polyethylene. The polyethylene having Mw of $1 \times 10^4$ or more and less than $5 \times 10^5$ can be not only an ethylene homopolymer, but also a copolymer containing a small amount of other α-olefin(s) such as propylene, butene-1, hexene-1, etc. Such copolymers are preferably produced using single-site catalysts. Not only one type of polyethylene other than the ultra-high-molecular-weight polyethylene, but also a mixture of two or more polyethylenes other than the ultra-high-molecular-weight polyethylene can be used. The mixture can be for instance, a mixture of two or more high-density polyethylenes having different Mws, a mixture of similar intermediate-density polyethylenes, a mixture of similar low-density polyethylenes, etc.

(c) Polyethylene Composition

The polyethylene composition is a mixture of ultra-high-molecular-weight polyethylene having Mw of $5 \times 10^5$ or more, and the other polyethylene, which is at least one selected from the group consisting of high-density polyethylene, intermediate-density polyethylene, branched low-density polyethylene, and linear low-density polyethylene. The ultra-high-molecular-weight polyethylene and the other polyethylene can be the same as described above. The other polyethylene preferably has Mw of $1 \times 10^4$ or more and less than $5 \times 10^5$. The molecular weight distribution [mass-average molecular weight/number-average molecular weight (Mw/Mn)] of this polyethylene composition can be easily controlled depending on applications. The polyethylene composition is preferably a composition of the above ultra-high-molecular-weight polyethylene and high-density polyethylene. The content of the ultra-high-molecular-weight polyethylene in the polyethylene composition is preferably 1% or more by mass, more preferably 1 to 80% by mass, based on 100% by mass of the entire polyethylene composition.

(d) Polyolefin Composition

The polyolefin composition is a mixture of the ultra-high-molecular-weight polyethylene, the other polyethylene or the polyethylene composition, and a polyolefin other than polyethylene. The ultra-high-molecular-weight polyethylene, the other polyethylene, and the polyethylene composition can be the same as described above.

The polyolefin other than polyethylene can be at least one selected from the group consisting of polypropylene, polybutene-1, polypentene-1, polyhexene-1, poly4-methylpentene-1, polyoctene-1, polyvinyl acetate, polymethyl methacrylate, polystyrene and ethylene-α-olefin copolymers each having Mw of $1 \times 10^4$ to $4 \times 10^6$, and a polyethylene wax having Mw of $1 \times 10^3$ to $1 \times 10^4$. Polypropylene, polybutene-1, polypentene-1, polyhexene-1, poly4-methylpentene-1, polyoctene-1, polyvinyl acetate, polymethyl methacrylate and polystyrene can not only be homopolymers, but also copolymers containing other α-olefin(s). The percentage of the polyolefin other than polyethylene is preferably 20% or less by mass, more preferably 10% or less by mass, based on 100% by mass of the entire polyolefin composition.

When the polyethylene resin forming the first microporous layer contains polypropylene, the resultant battery separator improves meltdown properties, and provides batteries with improved high-temperature storage properties. The polypropylene is a preferably homopolymer. In the case of a copolymer of propylene with other α-olefin(s), or a mixture of a homopolymer and a copolymer, the copolymer may be a block or random copolymer. The other α-olefin is preferably ethylene.

(e) Molecular Weight Distribution Mw/Mn

Mw/Mn is a measure of a molecular weight distribution, the larger this value, the wider the molecular weight distribution. Though not critical, the Mw/Mn of the polyethylene resin is preferably 5 to 300, more preferably 10 to 100, when the polyethylene resin is the ultra-high-molecular-weight polyethylene, the other polyethylene or the polyethylene composition. When the Mw/Mn is less than 5, there are excessive high-molecular weight components, resulting in difficulty in melt extrusion. When the Mw/Mn is more than 300, there are excessive low-molecular weight components, resulting in a microporous membrane with decreased strength. The Mw/Mn of the polyethylene (homopolymer or ethylene-α-olefin copolymer) may be properly controlled by multi-stage polymerization. The multi-stage polymerization method is preferably a two-stage polymerization method comprising forming a high-molecular-weight polymer component in the first stage and forming a low-molecular-weight polymer component in the second stage. In the case of the polyethylene composition, the larger the Mw/Mn, the larger difference in Mw between the ultra-high-molecular-weight polyethylene and the other polyethylene, and vice versa. The Mw/Mn of the polyethylene composition may be properly controlled by the molecular weight and percentage of each component.

[2] Mixture of Polyethylene Resin and Heat-Resistant Polymer

The second microporous layer in the multi-layer, microporous membrane is made of a mixture of the polyethylene resin, and a heat-resistant polymer having a melting point or a glass transition temperature of 170° C. or higher.

(a) Polyethylene Resin

The polyethylene resin for the second microporous layer may be the same as described above. The composition of the polyethylene resin for the second microporous layer may be the same as or different from that of the polyethylene resin for the first microporous layer, properly selectable depending on the desired properties.

(b) Heat-Resistant Polymer

The heat-resistant polymer has a melting point or a glass transition temperature Tg in a range of 170° C. or higher. The heat-resistant polymer is preferably a crystalline resin (including partially crystalline resin) having a melting point of 170° C. or higher, or an amorphous resin having Tg of 170° C. or higher. The melting point and Tg may be measured according to JIS K7121.

The heat-resistant polymer is dispersed in the form of spherical or ellipsoidal fine particles in the polyethylene resin during melt blending. Fibrils of the polyethylene resin are cleft during stretching, with fine particles of the heat-resistant polymer as nuclei, thereby forming creased pores holding fine particles in the center. Accordingly, a battery separator formed by the multi-layer, microporous polyethylene membrane has improved compression resistance and electrolytic solution absorbability. The particle sizes of the spherical fine particles and the longer diameters of the ellipsoidal fine particles are preferably 0.1 to 15 μm, more preferably 0.5 to 10 μm, particularly 1 to 10 μm.

When the crystalline resin having a melting point of lower than 170° C. or the amorphous resin having Tg of lower than 170° C. is used, the resin is highly dispersed in the polyethylene resin during melt blending, failing to form fine particles having proper diameters. As a result, small gaps are formed by cleavage with fine resin particles as nuclei, resulting in insufficient compression resistance and electrolytic solution absorbability. Through not particularly limited, the upper limit of the melting point or Tg of the heat-resistant polymer is preferably 300° C. from the aspect of the blendability with the polyethylene resin. The melting point or Tg of the heat-resistant polymer is more preferably 180 to 260° C.

The preferred Mw of the heat-resistant polymer is generally $1 \times 10^3$ to $1 \times 10^6$% more preferably $1 \times 10^4$ to $8 \times 10^5$, though variable depending on the type of the resin. The heat-resistant polymer having Mw of less than $1 \times 10^3$ is highly dispersed in the polyethylene resin, failing to form fine particles having proper diameters. The heat-resistant polymer having Mw of more than $1 \times 10^6$ cannot easily be blended with the polyethylene resin.

Specific examples of the heat-resistant polymer include polyesters, polymethylpentene [PMP or TPX (transparent polymer X)], polycarbonates (PC, melting point: 220 to 240° C.), polyamides (PA, melting point: 215 to 265° C.), fluororesins, polyarylene sulfides (PAS), polystyrene (PS, melting point: 230° C.), polyvinyl alcohol (PVA, melting point:

220 to 240° C.), polyimides (PI, Tg: 280° C. or higher), polyamideimides (PAI, Tg: 280° C.), polyethersulfone (PES, Tg: 223° C.), polyetheretherketone (PEEK, melting point: 334° C.), cellulose acetate (melting point: 220° C.), cellulose triacetate (melting point: 300° C.), polysulfone (Tg: 190° C.), polyetherimides (melting point: 216° C.), etc. Among them, polyesters, polymethylpentene, polycarbonates, polyamides, fluororesins and polyarylene sulfides are preferable, and polyesters, polymethylpentene, polycarbonates and polyamides are more preferable. The heat-resistant polymer may be composed of not only a single resin component but also pluralities of resin components. Detailed description will be made on polyesters, polymethylpentene, polycarbonates, polyamides, fluororesins and polyarylene sulfides.

(1) Polyesters

The polyesters include polybutylene terephthalate (PBT, melting point: about 160 to 230° C.), polyethylene terephthalate (PET, melting point: about 250 to 270° C.), polyethylene naphthalate (PEN, melting point: 272° C.), polybutylene naphthalate (PBN, melting point: 245° C.), etc., and PBT is preferable.

The PBT is essentially a saturated polyester composed of 1,4-butanediol and terephthalic acid. Within ranges not deteriorating properties such as heat resistance, compression resistance, heat shrinkage resistance, etc., other diols than 1,4-butanediol and other carboxylic acids than terephthalic acid can be included as comonomers. Such diols can be, for instance, ethylene glycol, diethylene glycol, neopentyl glycol, 1,4-cyclohexanemethanol, etc. The dicarboxylic acids can be, for instance, isophthalic acid, sebacic acid, adipic acid, azelaic acid, succinic acid, etc. A specific example of PBT resins can be, for instance, a homo-PBT resin commercially available from foray Industries, Inc. under the tradename of "Toraycon." PBT can be composed of not only a single component but also pluralities of PBT resin components. PBT particularly has Mw of $2\times10^4$ to $3\times10^5$.

(2) Polymethylpentene

PMP is essentially a polyolefin composed of any one of 4-methyl-1-pentene, 2-methyl-1-pentene, 2-methyl-2-pentene, 3-methyl-1-pentene and 3-methyl-2-pentene, preferably a homopolymer of 4-methyl-1-pentene. PMP can be a copolymer containing a small amount of other α-olefin(s) than methylpentene within a range not deteriorating properties such as heat resistance, compression resistance, heat shrinkage resistance, etc. The other α-olefins than methylpentene are suitably ethylene, propylene, butene-1, pentene-1, hexene-1, octene-1, vinyl acetate, methyl methacrylate, styrene, etc. PMP usually has a melting point of 230 to 245° C. PMP particularly has Mw of $3\times10^5$ to $7\times10^5$.

(3) Polycarbonates

The PC is preferably bisphenol-A-type PC. The bisphenol-A-type PC can be produced by (i) a transesterification reaction method of bisphenol A with diphenyl carbonate without a solvent (transesterification method), (ii) a method of subjecting bisphenol A and phosgene to an acid-removing polycondensation reaction in the presence of an acid-bonding agent in a solvent (phosgene method), or (iii) a method of adding phosgene to a suspension composed of an aqueous solution of bisphenol A and an alkali and an organic solvent, thereby causing a reaction in an interface between a water phase and an organic solvent phase (interface polycondensation method). The PC preferably has Mw of $2\times10^4$ to $4\times10^4$.

(4) Polyamides

The PA is preferably at least one selected from the group consisting of polyamide 6 (6-nylon), polyamide 66 (6, 6-nylon), polyamide 12 (12-nylon) and amorphous polyamide.

(5) Fluororesins

The fluororesins include polyvinylidene fluoride (PVDF, melting point: 171° C.), polytetrafluoroethylene (PTFE, melting point: 327° C.), a tetrafluoroethylene-perfluoroalkylvinyl ether copolymer (PFA, melting point: 310° C.), a tetrafluoroethylene-hexafluoropropylene-perfluoro(propylvinyl ether) copolymer (EPE, melting point: 295° C.), a tetrafluoroethylene-hexafluoropropylene copolymer (FEP, melting point: 275° C.), an ethylene-tetrafluoroethylene copolymer (ETFE, melting point: 270° C.), etc.

The preferred fluororesin is PVDF. PVDF can be a copolymer with other olefin(s) (vinylidene fluoride copolymer). The vinylidene fluoride content in the vinylidene fluoride copolymer is preferably 75% or more by mass, more preferably 90% or more by mass. Monomers copolymerizable with vinylidene fluoride include hexafluoropropylene, tetrafluoroethylene, trifluoropropylene, ethylene, propylene, isobutylene, styrene, vinyl chloride, vinylidene chloride, difluorochloroethylene, vinyl formate, vinyl acetate, vinyl propionate, vinyl butyrate, acrylic acid and its salt, methyl methacrylate, allyl methacrylate, acrylonitrile, methacrylonitrile, N-butoxymethyl acrylamide, allyl acetate, isopropenyl acetate, etc. The vinylidene fluoride copolymer is preferably a poly(hexafluoropropylene-vinylidene fluoride) copolymer.

(6) Polyarylene Sulfides

PAS is preferably polyphenylene sulfide (PPS, melting point: 285° C.). PPS can be linear or branched.

(7) Formulation

The heat-resistant polymer content is preferably 3 to 30% by mass, more preferably 5 to 25% by mass, based on the total amount (100% by mass) of the polyethylene resin and the heat-resistant polymer. When this content is less than 3% by mass, insufficient compression resistance and electrolytic solution absorbability are obtained. When this content is more than 30% by mass, the membrane has low pin puncture strength and decreased deformability when compressed.

[3] Other Additives

The polyethylene resin and its mixture with the heat-resistant polymer can contain various additives such as antioxidants, ultraviolet absorbers, anti-blocking agents, pigments, dyes, etc. within ranges not deteriorating the effects of this invention, if necessary. It should be noted that additives added to the mixture of the polyethylene resin and the heat-resistant polymer should be other than inorganic fillers. If inorganic fillers were added to the mixture of the polyethylene resin and the heat-resistant polymer, the resultant multi-layer, microporous membrane would have low shutdown properties, specifically, an elevated shutdown temperature or a lowered shutdown speed. Organic additives are used for the mixture of the polyethylene resin and the heat-resistant polymer. Of course, the mixture of the polyethylene resin and the heat-resistant polymer can contain inorganic oxides, etc. as inevitable impurities.

[4] Production Method of Multi-Layer, Microporous Polyethylene Membrane (a) First Production Method The first method of this invention for producing a multi-layer, microporous polyethylene membrane comprises the steps of (1) melt-blending a polyethylene resin and a membrane-forming solvent to prepare a first melt blend (first polyethylene solution), (2) melt-blending a polyethylene resin, a heat-resistant polymer and a membrane-forming solvent to prepare a second melt blend (second polyethylene solution), (3) separately extruding the first and second polyethylene solutions through dies, (4) cooling the resultant extrudates to provide gel-like sheets, (5) stretching each gel-like sheet, (6) removing the membrane-forming solvent from each gel-like sheet, (7) drying each sheet, and (8) laminating the resultant first and second microporous membranes. After the step (8), if necessary, a re-stretching step (9), a heat treatment step (10), a cross-linking step (11) with ionizing radiations, a hydrophilizing step (12), a surface-coating step (13), etc. can be conducted. Also, after the step (5), a heat-setting step (14) can be conducted. Before and/or after the step (6), a hot solvent treatment step (15) can be conducted.

(1) Preparation of First Polyethylene Solution

The polyethylene resin is melt-blended with a proper membrane-forming solvent to prepare a first polyethylene solution. Various additives such as antioxidants, inorganic fillers, etc. can be added to the first polyethylene solution within ranges not deteriorating the effects of this invention, if necessary. For instance, fine silica powder can be added as a pore-forming agent.

The membrane-forming solvent is preferably liquid at room temperature. The use of a liquid solvent enables stretching at a relatively high magnification. The liquid solvents can be linear or cyclic aliphatic hydrocarbons such as nonane, decane, decalin, p-xylene, undecane, dodecane, liquid paraffin, etc.; mineral oil distillates having boiling points corresponding to those of the above hydrocarbons; and phthalates liquid at room temperature, such as dibutyl phthalate, dioctyl phthalate, etc. To obtain a gel-like sheet having a stable liquid solvent content, it is preferable to use non-volatile liquid solvents such as liquid paraffin. Also, a solvent miscible with polyethylene in melt blending but solid at room temperature can be added to the liquid solvent. Such solid solvents are stearyl alcohol, ceryl alcohol, paraffin wax, etc. However, the only use of a solid solvent results in the likelihood of uneven stretching, etc.

The viscosity of the liquid solvent is preferably 30 to 500 cSt, more preferably 30 to 200 cSt, at 25° C. When the viscosity at 25° C. is less than 30 cSt, foaming easily occurs, resulting in difficulty in blending. The viscosity of more than 500 cSt makes the removal of the liquid solvent difficult.

Though not particularly critical, the uniform melt blending of the first polyethylene solution is preferably conducted in a double-screw extruder Melt blending in a double-screw extruder is suitable for providing a high-concentration polyethylene solution. In any case where the polyethylene resin is as described in any one of [1] (a) to (d) above, the melt-blending temperature is preferably in a range from Tm+10° C. to Tm+100° C., wherein Tm is the melting point of (a) the ultra-high-molecular-weight polyethylene, (b) the polyethylene other than the ultra-high-molecular-weight polyethylene, or (c) the polyethylene composition. Specifically, the melt-blending temperature is preferably 140 to 250° C., more preferably 170 to 240° C. The membrane-forming solvent can be added before starting the melt blending, or charged into the double-screw extruder at an intermediate position during the melt blending, though the latter is preferable. In the melt blending, an antioxidant is preferably added to prevent the oxidization of the polyethylene resin.

A ratio L/D, in which L and D respectively represent the length and diameter of a screw in the double-screw extruder, is preferably 20 to 100, more preferably 35 to 70. When L/D is less than 20, enough melt blending is not achieved. When L/D is more than 100, there is too much residence time for the polyethylene solution. A cylinder of the double-screw extruder preferably has an inner diameter of 40 to 80 mm.

The polyethylene resin content is preferably 10 to 50% by mass, more preferably 20 to 45% by mass, based on 100% by mass of the first polyethylene solution. Less than 10% by mass of the polyethylene resin content causes large swelling and neck-in at the die exit in the extrusion of the gel-like molding, resulting in decrease in the formability and self-supportability of the gel-like molding. More than 50% by mass of the polyethylene resin content deteriorates the formability of the gel-like molding.

(2) Preparation of Second Polyethylene Solution

The second polyethylene solution is prepared by melt-blending the polyethylene resin and the heat-resistant polymer with the above membrane-forming solvent. The second polyethylene solution can be prepared in the same manner as in the first polyethylene solution, except that the melt-blending temperature is preferably equal to or higher than the melting point of the crystalline heat-resistant polymer or the Tg of the amorphous heat-resistant polymer depending on the type of the heat-resistant polymer, that the solid content (polyethylene resin +heat-resistant polymer) in the polyethylene solution is preferably 1 to 50% by mass, and that an inorganic filler is not added. The solid content in the second polyethylene solution is more preferably 10 to 40% by mass.

With the melt-blending temperature equal to or higher than the melting point of the crystalline heat-resistant polymer or the Tg of the amorphous heat-resistant polymer, the heat-resistant polymer is dispersed in the form of fine particles in the polyethylene resin. The melt-blending temperature is more preferably in a range from the melting point of the crystalline heat-resistant polymer or the Tg of the amorphous heat-resistant polymer to the melting point of the polyethylene resin +120° C. For instance, when PBT having a melting point of about 160 to 230° C. is used as the heat-resistant polymer, the melt-blending temperature is preferably 160 to 260° C., more preferably 180 to 250° C. When PMP having a melting point of 230 to 245° C. is used as the heat-resistant polymer, the melt-blending temperature is preferably 230 to 260° C.

(3) Extrusion

Each of the first and second polyethylene solutions is extruded through the die of the extruder directly or through a die of another extruder, or once cooled to pellets and extruded through a die of an extruder again. Although a sheet-forming die having a rectangular orifice is usually used, a double-cylindrical hollow die, an inflation die, etc. can also be used. The sheet-forming die usually has a die gap of 0.1 to 5 mm, and is heated at 140 to 250° C. during extrusion. The extrusion speed of the heated solution is preferably 0.2 to 15 m/minute.

(4) Formation of Gel-Like Sheet

The polyethylene solutions extruded from the dies are cooled to provide first and second sheet-shaped, gel-like moldings (gel-like sheets). The cooling is preferably conducted to at least a gelation temperature at a speed of 50° C./minute or more. The cooling is preferably conducted to 25° C. or lower. Thus provided is a fixed micro-phase separation of a resin phase (a polyethylene resin phase in the first gel-like sheet, and a polyethylene resin phase and a heat-resistant polymer phase in the second gel-like sheet) by the membrane-forming solvent. In general, a lower cooling speed provides the gel-like sheet with a coarser high-order structure, and larger pseudo-cell units constituting the high-order structure, while a higher cooling speed provides denser cell units. The cooling speed of less than 50° C./minute increases crystallization, making it difficult to form a stretchable gel-like sheet. The cooling method can be a method of bringing the extrudate into direct contact with a cooling medium such as a cooling air, a cooling water, etc., a method of bring the extrudate into contact with a cooling roll, etc.

(5) Stretching

The resultant first and second gel-like sheets are stretched in at least one direction. Because each gel-like sheet contains a membrane-forming solvent, it can be uniformly stretched.

After heating, each gel-like sheet is stretched to a predetermined magnification by a tenter method, a roll method, an inflation method, a rolling method, or combination thereof. Although the stretching can be monoaxial or biaxial, biaxial stretching is preferable. The biaxial stretching can be simultaneous biaxial stretching, sequential stretching, or multi-stage stretching (for instance, a combination of simultaneous biaxial stretching and sequential stretching), though the simultaneous biaxial stretching is preferable. The stretching improves the mechanical strength.

The stretching magnification is preferably 2-fold or more, more preferably 3- to 30-fold in the case of monoaxial stretching. In the case of biaxial stretching, the stretching magnification is at least 3-fold in both directions, with an area magnification of preferably 9-fold or more, more preferably 25-fold or more. The area magnification of 9-fold or more improves the pin puncture strength. When the area magnification is more than 400-fold, there are restrictions in stretching apparatuses, stretching operations, etc.

When the polyethylene resin in each of the first and second gel-like sheets is the ultra-high-molecular-weight polyethylene or the other polyethylene (not a composition), the stretching temperature is preferably the melting point $Tm_1$ of the polyethylene resin +10° C. or lower, more preferably in a range of the crystal dispersion temperature of the polyethylene resin or higher and lower than the crystal melting point of the polyethylene resin, regardless of whether the polyethylene resin is a homopolymer or a copolymer. When this stretching temperature is higher than the melting point $Tm_1$+ 10° C., the polyethylene resin is melted, failing to orient molecular chains of the polyethylene resin by stretching. When the stretching temperature is lower than the crystal dispersion temperature, the polyethylene resin is so insufficiently softened that rupture is likely to occur in stretching, thus failing to achieve high-magnification stretching. When the sequential stretching or the multi-stage stretching is conducted, the first stretching can be conducted at a temperature lower than the crystal dispersion temperature. The crystal dispersion temperature is determined by measuring the temperature characteristics of dynamic viscoelasticity according to ASTM D 4065. The ultra-high-molecular-weight polyethylene and the other polyethylene than that have crystal dispersion temperatures of about 90 to 100° C.

When the polyethylene resin in each of the first and second gel-like sheets is the polyethylene composition, the stretching temperature is preferably in a range from the crystal dispersion temperature of the polyethylene composition to the crystal melting point +10° C. Thus, the stretching temperature is usually in a range of 100 to 140° C., preferably in a range of 110 to 120° C.

Depending on the desired properties, stretching can be conducted with a temperature distribution in a thickness direction, or a sequential or multi-stage stretching comprising a first stretching at a relatively low temperature and a second stretching at a high temperature can be conducted. The stretching with a temperature distribution in a thickness direction generally provides a microporous polyethylene membrane with excellent mechanical strength. The details of that method are described in Japanese Patent 3,347,854.

The above stretching generates cleavage in polyethylene lamellas, thereby making a polyethylene resin phase finer to form large numbers of fibrils. The resultant fibrils constitute a three-dimensionally and irregularly connected network structure. In the second gel-like sheet, fibrils are cleft with fine particles of the heat-resistant polymer as nuclei, thereby forming creased pores holding fine particles.

(6) Removal of Membrane-Forming Solvent

The liquid solvent is removed (washed away) using a washing solvent. Because the resin phase (the polyethylene resin phase in the first gel-like sheet, and the polyethylene resin phase and the heat-resistant polymer phase in the second gel-like sheet) is separated from the membrane-forming solvent phase, the removal of the liquid solvent provides a microporous membrane. The removal (washing away) of the liquid solvent can be conducted using a known washing solvent. The washing solvents can be volatile solvents, for instance, saturated hydrocarbons such as pentane, hexane, heptane, etc.; chlorinated hydrocarbons such as methylene chloride, carbon tetrachloride, etc.; ethers such as diethyl ether, dioxane, etc.; ketones such as methyl ethyl ketone, etc.; linear fluorocarbons such as trifluoroethane, $C_6F_{14}$, $C_7F_{16}$, etc.; cyclic hydrofluorocarbons such as $C_5H_3F_7$, etc.; hydrofluoroethers such as $C_4F_9OCH_3$, $C_4F_9OC_2H_5$, etc.; and perfluoroethers such as $C_4F_9OCF_3$, $C_4F_9OC_2F_5$, etc. These washing solvents have a low surface tension, for instance, 24 mN/m or less at 25° C. The use of a washing solvent having a low surface tension suppresses a pore-forming network structure from shrinking due to a surface tension of gas-liquid interfaces during drying after washing, thereby providing a microporous membrane having high porosity and permeability.

The washing after stretching can be conducted by a washing-solvent-immersing method, a washing-solvent-showering method, or a combination thereof. The amount of the washing solvent used is preferably 300 to 30,000 parts by mass per 100 parts by mass of the stretched membrane. Washing with the washing solvent is preferably conducted until the amount of the remaining liquid solvent becomes less than 1% by mass of that added.

(7) Drying

The first and second microporous polyethylene membranes obtained by stretching and the removal of the membrane-forming solvent are then dried by a heat-drying method, a wind-drying method, etc. The drying temperature is preferably equal to or lower than the crystal dispersion temperature of the polyethylene resin, particularly 5° C. or more lower than the crystal dispersion temperature. Drying is conducted until the percentage of the remaining washing solvent becomes preferably 5% or less by mass, more preferably 3% or less by mass, based on 100% by mass of the microporous membrane (dry weight). Insufficient drying undesirably reduces the porosity of the microporous membrane in a subsequent heat treatment, thereby resulting in poor permeability.

(8) Lamination

The first and second microporous membranes after drying or heat treatment are laminated in a desired layer structure. Though not particularly critical, the laminating method is preferably a heat-laminating method. The heat-laminating method includes a heat-sealing method, an impulse-sealing method, an ultrasonic laminating method, etc., and the heat-sealing method is preferable. The heat-sealing method preferably uses a heat roll. In the heat roll method, the first and second microporous polyethylene membranes that are overlapped are heat-sealed by passing through a pair of heating rolls, or between a heat roll and a table. The heat-sealing temperature and pressure are not particularly critical, as long as the microporous polyethylene membranes are sufficiently bonded, and unless the resultant multi-layer, microporous membrane has low properties. The heat-sealing temperature is, for instance, 90 to 135° C., preferably 90 to 115° C. The heat-sealing pressure is preferably 0.01 to 50 MPa.

(9) Re-Stretching

The multi-layer, microporous polyethylene membrane is preferably stretched again in at least one direction. The re-stretching can be conducted by the same tenter method as described above, etc., while heating the membrane. The re-stretching can be monoaxial or biaxial. The biaxial stretching can be either simultaneous biaxial stretching or sequential stretching, though the simultaneous biaxial stretching is preferable.

The re-stretching temperature is preferably equal to or lower than the melting point of (a) the ultra-high-molecular-weight polyethylene, (b) the polyethylene other than ultra-high-molecular-weight polyethylene, or (c) the polyethylene composition contained in the polyethylene resin in the first microporous layer, more preferably in a range from the crystal dispersion temperature to the melting point. The re-stretching temperature exceeding the melting point results in decreased compression resistance, and large unevenness of properties (particularly air permeability) in a width direction when stretched in a transverse direction (TD). When the re-stretching temperature is lower than the crystal dispersion temperature, the resin is insufficiently softened, so that the membrane is easily broken by stretching, failing to achieve uniform stretching. Specifically, the stretching temperature is usually in a range from 90° C. to 135° C., preferably in a range from 95° C. to 130° C.

The magnification of the re-stretching in one direction is preferably 1.1- to 2.5-fold, to provide the multi-layer, microporous membrane with improved compression resistance. In the case of monoaxial stretching, for instance, the re-stretching magnification is 1.1- to 2.5-fold in either a longitudinal direction (MD) or a transverse direction (TD). In the case of biaxial stretching, the re-stretching magnification is 1.1- to 2.5-fold in both MD and TD. In the biaxial stretching, the stretching magnification can be the same or different between MD and TD as long as it is 1.1- to 2.5-fold, though it is preferable the same between MD and TD. When this magnification is less than 1.1-fold, sufficient compression resistance cannot be obtained. When this magnification is more than 2.5-fold, the membrane is highly likely broken and has undesirably low heat shrinkage resistance. The re-stretching magnification is more preferably 1.1- to 2.0-fold.

(10) Heat Treatment

The multi-layer, microporous polyethylene membrane is preferably heat-treated. The heat treatment stabilizes crystals, thereby making lamellas more uniform. The heat treatment can be heat-setting and/or heat-shrinking, properly selectable depending on the desired properties. The heat treatment is conducted at a temperature equal to or lower than the melting point of (a) the ultra-high-molecular-weight polyethylene, (b) the polyethylene other than the ultra-high-molecular-weight polyethylene, or (c) the polyethylene composition contained in the polyethylene resin in the first microporous layer, preferably in a range from 60° C. to the melting point −10° C.

The heat-setting treatment is more preferably conducted by a tenter method, a roll method or a rolling method. The heat-shrinking treatment can be conducted using a belt conveyer or an air-floating furnace in addition to the above method. In the heat-shrinking treatment, a shrinkage ratio is preferably 50% or less, more preferably 30% or less, in at least one direction. Particularly when the heat-shrinking treatment is conducted after the re-stretching treatment, a multi-layer, microporous polyethylene membrane with a high strength and a low shrinkage ratio can be obtained.

(11) Cross-Linking

The multi-layer, microporous polyethylene membrane is preferably cross-linked by ionizing radiation such as α-rays, β-rays, γ-rays, electron beams, etc. The electron beam irradiation is preferably conducted at 0.1 to 100 Mrad and accelerating voltage of 100 to 300 kV. The cross-linking treatment elevates the meltdown temperature of the multi-layer, microporous polyethylene membrane.

(12) Hydrophilizing

The multi-layer, microporous polyethylene membrane can be hydrophilized. The hydrophilizing treatment can be a monomer-grafting treatment, a surfactant treatment, a corona discharge treatment, etc. The monomer-grafting treatment is preferably conducted after the cross-linking.

In case of the surfactant treatment, any of nonionic surfactants, cationic surfactants, anionic surfactants and amphoteric surfactants can be used, but the nonionic surfactants are preferable. The multi-layer, microporous membrane is dipped in a solution of the surfactant in water or a lower alcohol such as methanol, ethanol, isopropyl alcohol, etc., or coated with the solution by a doctor blade method.

(13) Surface-Coating

The multi-layer, microporous polyethylene membrane can be coated with porous polypropylene, a porous fluororesin such as polyvinylidene fluoride and polytetrafluoroethylene, porous polyimide, porous polyphenylene sulfide, etc., to improve meltdown properties when used as a battery separator. Polypropylene for a coating layer preferably has Mw of 5,000 to 500,000 and solubility of 0.5 g or more in 100 g of toluene at a temperature of 25° C. This polypropylene more preferably has a racemic diad fraction of 0.12 to 0.88. In the racemic diad, two connected monomer units are in an enantiomer relation. The surface-coating layer can be formed, for instance, by coating the multi-layer, microporous membrane with a mixed solution containing a resin for the above coating layer and its good solvent, removing the good solvent to increase the concentration of the resin, thereby forming a structure in which a resin phase is separated from a good solvent phase, and then removing the remaining good solvent.

(14) Heat-Setting after Stretching

After the gel-like sheet stretched in the step (5) is heat-set, the membrane-forming solvent can be removed. The heat-setting treatment can be the same as described above.

(15) Hot Solvent Treatment

A treatment of bringing the stretched gel-like sheet before the step (6) (the first and/or second stretched gel-like sheets before washing) and/or the microporous membrane after the step (6) (the first and/or second microporous membranes after washing) into contact with a hot solvent can be conducted. The hot solvent treatment is preferably conducted on the stretched gel-like sheet before washing. A heat treatment solvent is preferably the above liquid membrane-forming solvent, more preferably liquid paraffin, though it can be the same as or different from the solvent used for preparing the polyethylene solution.

The hot solvent treatment method is not particularly critical as long as the stretched gel-like sheet or microporous membrane comes into contact with a hot solvent. It includes, for instance, a method of directly contacting the stretched gel-like sheet or microporous membrane with a hot solvent (simply called "direct method" unless otherwise mentioned), a method of contacting the stretched gel-like sheet or microporous membrane with a cold solvent and then heating it (simply called, "indirect method" unless otherwise mentioned), etc. The direct method includes a method of immersing the stretched gel-like sheet or microporous membrane in a hot solvent, a method of spraying a hot solvent to the stretched gel-like sheet or microporous membrane, a method of coating the stretched gel-like sheet or microporous membrane with a hot solvent, etc., and the immersing method is preferable for uniform treatment. In the indirect method, the stretched gel-like sheet or microporous membrane is immersed in a cold solvent, sprayed with a cold solvent, or coated with a cold solvent, and then brought into contact with a heat roll, heated in an oven, or immersed in a hot solvent.

The pore size and porosity of the membrane can be controlled by changing the temperature and time of the hot solvent treatment step. In any case where the polyethylene resin is as described in any one of [1] (a) to (d) above, the hot solvent temperature is preferably in a range from the crystal dispersion temperature of (a) the ultra-high-molecular-weight polyethylene, (b) the polyethylene other than the ultra-high-molecular-weight polyethylene, or (c) the polyethylene composition contained in the polyethylene resin to the melting point +10° C. Specifically, the hot solvent temperature is preferably 110 to 140° C., more preferably 115 to 135° C. The contact time is preferably 0.1 seconds to 10 minutes, more preferably 1 second to 1 minute.

The above hot solvent treatment turns fibrils formed by stretching to a leaf-vein-like form with relatively thick trunks, resulting in a microporous membrane with a large pore size and excellent strength and permeability. The leaf-vein-like fibrils comprise thick trunk fibers and thin branch fibers extending therefrom, which is entangled to form a complicated network.

After the hot solvent treatment, the stretched gel-like sheet or microporous membrane is washed to remove the remaining heat treatment solvent. Because the washing method can be the same as the method of removing the above membrane-forming solvent, its description will be omitted. Needless to say, when the hot solvent treatment is conducted on the stretched gel-like sheet before washing, the heat treatment solvent can be removed in the above membrane-forming-solvent-removing treatment.

(b) Second Production Method

The second production method comprises the steps of (1) preparing first and second polyethylene solutions in the same manner as in the first production method, (2) simultaneously extruding the first and second polyethylene solutions through a die, to form a laminar extrudate, (3) cooling the extrudate to provide a multi-layer, gel-like sheet, (4) stretching the multi-layer, gel-like sheet, (5) removing the membrane-forming solvent from the stretched multi-layer, gel-like sheet, and (6) drying the resultant membrane. After the step (6), if necessary, a re-stretching step (7), a heat treatment (8), a cross-linking step (9) with ionizing radiations, a hydrophilizing step (10), a surface-coating step (11), etc. can be conducted. Also, after the step (4), a heat-setting treatment (12) can be conducted. Before and/or after the step (5), a hot solvent treatment step (13) can be conducted. The stretching method, the membrane-forming-solvent-removing method, the drying method, the re-stretching method, the heat treatment method, the cross-linking method, the hydrophilizing method, the surface-coating method, and the hot solvent treatment method can be the same as described above. Accordingly, only the simultaneous extrusion step (2) and the step (3) of forming the multi-layer, gel-like sheet will be described below in detail.

In the simultaneous extrusion of the first and second polyethylene solutions, when both solutions are combined in a laminar manner within one die and then extruded in the form of a sheet (bonding inside the die), pluralities of extruders are connected to one die. Alternatively, when both solutions are extruded in a sheet form from separate dies and then laminated (bonding outside the die), each extruder is connected to each die. The bonding inside the die is preferable.

In the simultaneous extrusion, any of a flat-die method and an inflation method can be used. To achieve the bonding inside the die in either method, a method of supplying each solution to each of manifolds connected to a multi-layer-forming die and laminating them in a laminar manner at a die lip (multi-manifold method), or a method of laminating the solutions in a laminar manner and then supplying the resultant laminate to a die (block method) can be used. Because the multi-manifold method and the block method per se are known, their detailed description will be omitted. A known flat or inflation die can be used. The multi-layer-forming flat die preferably has a gap of 0.1 to 5 mm. When bonding is conducted outside the die by the flat die method, sheet-shaped solutions extruded through the dies can be laminated under pressure between a pair of rolls. In any method described above, the die is heated at a temperature of 140 to 250° C. during extrusion. The extrusion speed of the heated solution is preferably 0.2 to 15 m/minute. The laminar extrudate thus formed is cooled to provide a multi-layer, gel-like sheet. The cooling speed, temperature and method of the laminar extrudate can be the same as in the first production method.

[5] Properties of Multi-Layer, Microporous Polyethylene Membrane

The multi-layer, microporous polyethylene membrane produced by the above methods has the following properties.

(a) Porosity of 25 to 80%

With the porosity of less than 25%, the multi-layer, microporous polyethylene membrane does not have good air permeability. When the porosity exceeds 80%, the multi-layer, microporous polyethylene membrane used as a battery separator does not have enough strength, resulting in a high likelihood of short-circuiting between electrodes.

(b) Air Permeability of 20 to 400 Seconds/100 $cm^3$ (Converted to the Value at 20-μm Thickness)

When the air permeability is in a range from 20 to 400 seconds/100 $cm^3$, batteries having separators formed by the multi-layer, microporous polyethylene membrane have large capacity and good cycle characteristics. When the air permeability is more than 400 seconds/100 $cm^3$, batteries have small capacity. When the air permeability is less than 20 seconds/100 $cm^3$, shutdown does not fully occur when the temperature is elevated in the batteries.

(c) Pin Puncture Strength of 3,000 mN/20 μm or More

With the pin puncture strength of less than 3,000 mN/20 μm, a battery comprising the multi-layer, microporous polyethylene membrane as a separator likely suffers short-circuiting between electrodes. The pin puncture strength is preferably 3,500 mN/20 μm or more.

(d) Tensile Rupture Strength of 80,000 kPa or More

With the tensile rupture strength of 80,000 kPa or more in both longitudinal direction (MD) and transverse direction (TD), the membrane is unlikely ruptured when used as a battery separator. The tensile rupture strength is preferably 100,000 kPa or more in both MD and TD.

(e) Tensile Rupture Elongation of 100% or More

With the tensile rupture elongation of 100% or more in both longitudinal direction (MD) and transverse direction (TD), the membrane is unlikely ruptured when used as a battery separator.

(f) Heat Shrinkage Ratio of 10% or Less

When the heat shrinkage ratio exceeds 10% in both longitudinal direction (MD) and transverse direction (TD) after exposed to 105° C. for 8 hours, battery separators formed by the multi-layer, microporous polyethylene membrane shrink by heat generated by the batteries, resulting in high likelihood of short-circuiting in their end portions. The heat shrinkage ratio is preferably 8% or less in both MD and TD.

(g) Thickness Change Ratio of 30% or More by Heat Compression

The thickness change ratio by heat compression at a temperature of 90° C. and a pressure of 2.2 MPa (22 kgf/cm$^2$) to 5 MPa (50 kgf/cm$^2$) for 5 minutes is 30% or more, based on 100% of the thickness before compression. With the thickness change ratio of 30% or more, a battery separator formed by the multi-layer, microporous membrane can well absorb the expansion of electrodes. This thickness change ratio is preferably 40% or more.

(h) Air Permeability Increase of 500 Sec/100 cm$^3$ or Less

The air permeability increase by heat compression under the above conditions is 500 sec/100 cm$^3$ or less. With the air permeability increase of 500 sec/100 cm$^3$ or less, a separator formed by the multi-layer, microporous membrane provides a battery with large capacity and good cycle characteristics. The air permeability increase is preferably 300 sec/100 cm$^3$ or less.

(i) Shutdown Temperature of 140° C. or Lower

When the shutdown temperature is higher than 140° C., the multi-layer, microporous membrane used as a lithium battery separator has slow shutdown response when overheated. The shutdown temperature is preferably 120 to 140° C.

(j) Shutdown Speed of 10 Seconds or Less

When the shutdown speed (135° C.) is more than 10 seconds, the multi-layer, microporous membrane used as a lithium battery separator has slow shutdown response property when overheated. The shutdown speed is preferably 7 seconds or less.

(k) Meltdown Temperature of 165° C. or Higher

The meltdown temperature is preferably 165 to 190° C.

(l) Electrolytic Solution Absorption of 0.3 g/g or More

When the multi-layer, microporous membrane is immersed in an electrolytic solution at room temperature, the amount of the electrolytic solution absorbed by the multi-layer, microporous membrane is 0.3 g/g or more per the mass of the membrane [amount of electrolytic solution absorbed (g)/mass of membrane before absorption (g)]. This electrolytic solution absorption is preferably 0.4 g/g or more.

[6] Battery Separator

The thickness of the battery separator formed by the above multi-layer, microporous polyethylene membrane is preferably 3 to 200 µm, more preferably 5 to 50 µm, though properly selected depending on the types of batteries.

The battery separator can comprise at least one first microporous layer and at least one second microporous layer. When the battery separator comprises pluralities of first or second microporous layers, layers of the same type can have the same or different compositions. Though not critical, the battery separator preferably has a two-layer structure of the first microporous layer and the second microporous layer, or a three-layer structure of the first microporous layer, the second microporous layer and the first microporous layer. Through the thickness ratio of the first microporous layer to the second microporous layer is not particularly critical, the thickness ratio of the second microporous layer to the multi-layer, microporous membrane is preferably 20 to 90%, more preferably 30 to 80%.

[7] Battery

The multi-layer, microporous polyethylene membrane of this invention can be used preferably as a separator for secondary batteries such as nickel-hydrogen batteries, nickel-cadmium batteries, nickel-zinc batteries, silver-zinc batteries, lithium secondary batteries, lithium polymer secondary batteries, etc., particularly as a separator for lithium secondary batteries. Taking the lithium secondary battery for example, description will be made below.

The lithium secondary battery comprises a cathode and an anode laminated via a separator, the separator containing an electrolytic solution (electrolyte). The electrode can be of any known structure, not particularly critical. The electrode structure can be, for instance, a coin type in which disc-shaped cathode and anode are opposing, a laminate type in which planar cathode and anode are alternately laminated, a toroidal type in which ribbon-shaped cathode and anode are wound, etc.

The cathode usually comprises a current collector, and a cathodic active material layer capable of absorbing and discharging lithium ions, which is formed on the current collector. The cathodic active materials can be inorganic compounds such as transition metal oxides, composite oxides of lithium and transition metals (lithium composite oxides), transition metal sulfides, etc. The transition metals can be V, Mn, Fe, Co, Ni, etc. Preferred examples of the lithium composite oxides are lithium nickelate, lithium cobaltate, lithium manganate, laminar lithium composite oxides having an $\alpha$-NaFeO$_2$ structure, etc. The anode comprises a current collector, and an anodic active material layer formed on the current collector. The anodic active materials can be carbonaceous materials such as natural graphite, artificial graphite, cokes, carbon black, etc.

The electrolytic solutions can be obtained by dissolving lithium salts in organic solvents. The lithium salts can be LiClO$_4$, LiPF$_6$, LiAsF$_6$, LiSbF$_6$, LiBF$_4$, LiCF$_3$SO$_3$, LiN(CF$_3$SO$_2$)$_2$, LiC(CF$_3$SO$_2$)$_3$, Li$_2$B$_{10}$Cl$_{10}$, LiN(C$_2$F$_5$SO$_2$)$_2$, LiPF$_4$(CF$_3$)$_2$, LiPF$_3$(C$_2$F$_5$)$_3$, lower aliphatic carboxylates of lithium, LiAlCl$_4$, etc. The lithium salts can be used alone or in combination. The organic solvents can be organic solvents having high boiling points and high dielectric constants such as ethylene carbonate, propylene carbonate, ethylmethyl carbonate, $\gamma$-butyrolactone, etc.; organic solvents having low boiling points and low viscosity such as tetrahydrofuran, 2-methyltetrahydrofuran, dimethoxyethane, dioxolane, dimethyl carbonate, diethyl carbonate, etc. These organic solvents can be used alone or in combination. Because organic solvents having high dielectric constants have high viscosity, while those having low viscosity have low dielectric constants, their mixtures are preferably used.

When the battery is assembled, the separator can be impregnated with the electrolytic solution, so that the separator (multi-layer, microporous membrane) is provided with ion permeability. The impregnation usually is conducted by immersing the multi-layer, microporous membrane in the electrolytic solution at room temperature. When a cylindrical battery is assembled, for instance, a cathode sheet, a separator formed by the multi-layer, microporous membrane, and an anode sheet are laminated in this order, and the resultant laminate is wound to a toroidal-type electrode assembly. The resulting electrode assembly can be charged into a battery can and impregnated with the above electrolytic solution. A battery lid acting as a cathode terminal equipped with a safety valve can be caulked to the battery can via a gasket to produce a battery.

This invention will be described in more detail with reference to Examples below without intention of restricting the scope of this invention.

EXAMPLE 1

(1) Production of First Microporous Membrane

Dry-blended were 100 parts by mass of a polyethylene (PE) composition comprising 25% by mass of ultra-highmolecular-weight polyethylene (UHMWPE) having a mass-average molecular weight (Mw) of $2.0 \times 10^6$, and 75% by mass of high-density polyethylene (HDPE) having Mw of $3.5 \times 10^5$, with 0.2 parts by mass of tetrakis[methylene-3-(3,5-ditertiary-butyl-4-hydroxyphenyl)-propionate]methane as an antioxidant. Measurement revealed that the polyethylene composition comprising UHMWPE and HDPE had a melting point of 135° C. and a crystal dispersion temperature of 90° C.

The Mws of UHMWPE and HDPE were measured by gel permeation chromatography (GPC) under the following conditions.

- Measurement apparatus: GPC-150C available from Waters Corporation,
- Column: Shodex UT806M available from Showa Denko K.K.,
- Column temperature: 135° C.,
- Solvent (mobile phase): o-dichlorobenzene,
- Solvent flow rate: 1.0 ml/minute,
- Sample concentration: 0.1% by weight (dissolved at 135° C. for 1 hour),
- Injected amount: 500 µl,
- Detector: Differential Refractometer available from Waters Corp., and
- Calibration curve: Produced from a calibration curve of a single-dispersion, standard polystyrene sample using a predetermined conversion constant.

30 parts by mass of the resultant mixture was charged into a strong-blending, double-screw extruder (inner diameter=58 mm, L/D=42), and 70 parts by mass of liquid paraffin [35 cst (40° C.)] was supplied to the double-screw extruder via its side feeder. Melt-blending was conducted at 230° C. and 250 rpm to prepare a first polyethylene (PE) solution. The first polyethylene solution was extruded from a T-die attached to a tip end of the double-screw extruder, and the extrudate was cooled by contact with a cooling roll controlled at 0° C. to provide a first gel-like sheet.

Using a tenter-stretching machine, the first gel-like sheet was simultaneously and biaxially stretched at 117° C., such that the stretching magnification was 5-fold in both longitudinal direction (MD) and transverse direction (TD). Fixed to an aluminum frame of 20 cm×20 cm, the stretched membrane was immersed in methylene chloride [surface tension: 27.3 mN/m (25° C.), boiling point: 40.0° C.] controlled at 25° C., and washed with the vibration of 100 rpm for 3 minutes. The washed membrane was air-dried at room temperature, and fixed to the tenter to produce a first microporous membrane having a thickness of 75 µm.

(2) Production of Second Microporous Membrane

Dry-blended were 100 parts by mass of a composition comprising 25% by mass of UHMWPE, 65% by mass of HDPE, and 10% by mass of polybutylene terephthalate (PBT) having Mw of $3.8 \times 10^4$ and a melting point 230° C., with 0.2 parts by mass of the above antioxidant. Measurement revealed that the polyethylene composition of UHMWPE and HDPE had a melting point of 135° C. and a crystal dispersion temperature of 90° C.

30 parts by mass of the resultant mixture was charged into a double-screw extruder of the same type as described above, and 70 parts by mass of liquid paraffin [35 cst (40° C.)] was supplied to the double-screw extruder via its side feeder. Melt-blending was conducted under the same conditions as described above to prepare a second polyethylene solution. The second polyethylene (PE) solution was formed into a second microporous membrane having a thickness of 75 µm in the same manner as above.

(3) Lamination

The first and second microporous membranes were overlapped and caused to pass through a pair of rolls heated at a temperature of 110° C., so that they were bonded at a pressure of 0.2 MPa. The resultant multi-layer, microporous membrane was stretched to 1.6-fold in MD by multi-stage heat rolls at a temperature of 110° C., and then to 1.6-fold in TD by multi-stage heat rolls at a temperature of 110° C. Fixed to a tenter, the multi-layer, microporous membrane was annealed at a temperature of 125° C. for 10 minutes to produce a two-layer, microporous polyethylene membrane having a thickness of 24.9 µm.

EXAMPLE 2

A two-layer, microporous polyethylene membrane was produced in the same manner as in Example 1, except that a resin mixture for the second microporous layer comprised 25% by mass of UHMWPE, 55% by mass of HDPE, and 20% by mass of PBT.

EXAMPLE 3

A three-layer, microporous polyethylene membrane was produced in the same manner as in Example 1, except that the first and second microporous membranes each having a thickness of 50 µm were produced, and that the first microporous membranes were bonded to both surfaces of the second microporous membrane.

EXAMPLE 4

First and second polyethylene solutions were prepared in separate double-screw extruders in the same manner as in Example 1, supplied to a three-layer-forming T-die, through which they were extruded in a lamination order of the first PE solution, the second PE solution and the first PE solution. The thickness of a second PE solution layer was 33% of the total thickness of the laminate. The extrudate was cooled by contact with a cooling roll controlled to 0° C., to provide a three-layer, gel-like sheet. Using a tenter-stretching machine, the three-layer, gel-like sheet was simultaneously and biaxially stretched to 5-fold in both longitudinal direction (MD) and transverse direction (TD) at 117° C. The stretched three-layer, gel-like sheet was washed and air-dried in the same manner as in Example 1. Fixed to a tenter, it was annealed at 125° C. for 10 minutes to form a three-layer, microporous polyethylene membrane having a thickness of 24.8 µm.

EXAMPLE 5

A first polyethylene solution was prepared in the same manner as in Example 1, except that a polyethylene resin for a first microporous layer was a composition comprising 25% by mass of UHMWPE and 75% by mass of HDPE having Mw of $5.0 \times 10^5$. A second polyethylene solution was prepared in the same manner as in Example 1, except that a resin mixture for a second microporous layer was a composition comprising 25% by mass of UHMWPE, 65% by mass of HDPE having Mw of $5.0 \times 10^5$ and 10% by mass of PBT. A two-layer, microporous polyethylene membrane was produced in the same manner as in Example 1 except for using the resultant polyethylene solutions.

EXAMPLE 6

A two-layer, microporous polyethylene membrane was produced in the same manner as in Example 5 except for using polymethylpentene (TPX) having Mw of $5.2 \times 10^5$ and a melting point of 235° C. as the heat-resistant polymer.

EXAMPLE 7

A two-layer, microporous polyethylene membrane was produced in the same manner as in Example 5 except for using polycarbonates (PC) having Mw of $3 \times 10^4$ and a melting point of 220° C. as the heat-resistant polymer.

EXAMPLE 8

A two-layer, microporous polyethylene membrane was produced in the same manner as in Example 5 except for using polyamides 6 (PA6) having Mw of $1.1 \times 10^4$ and a melting point of 215° C. as the heat-resistant polymer.

EXAMPLE 9

A three-layer, microporous polyethylene membrane was produced in the same manner as in Example 5, except that first and second microporous membranes each having a thickness of 50 μm were produced, and that the first microporous membranes were bonded to both surfaces of the second microporous membrane.

EXAMPLE 10

First and second polyethylene solutions were prepared in separate double-screw extruders in the same manner as in Example 5, supplied to a three-layer-forming T-die, from which a laminate of the first PE solution, the second PE solution and the first PE solution was extruded. The thickness of a second PE solution layer was 33% of the total thickness of the laminate. The extrudate was cooled by contact with a cooling roll controlled to 0° C., to provide a three-layer, gel-like sheet. Using a tenter-stretching machine, the three-layer, gel-like sheet was simultaneously and biaxially stretched to 5-fold in both longitudinal direction (MD) and transverse direction (TD) at 117° C. The stretched three-layer, gel-like sheet was washed and air-dried in the same manner as in Example 1. Fixed to a tenter, it was annealed at 125° C. for 10 minutes to form a three-layer, microporous polyethylene membrane having a thickness of 24.8 μm.

COMPARATIVE EXAMPLE 1

A microporous membrane made of the polyethylene composition was produced in the same manner as the method of producing the first microporous membrane in Example 1.

COMPARATIVE EXAMPLE 2

A microporous membrane made of the polyethylene composition and PBT was produced in the same manner as the method of producing the second microporous membrane in Example 1, except for changing the formulation to 20% by mass of UHMWPE, 70% by mass of HDPE and 10% by mass of PBT.

COMPARATIVE EXAMPLE 3

A two-layer, microporous polyethylene membrane was produced in the same manner as in Example 1 except for using a propylene homopolymer (PP) having Mw of $5.3 \times 10^5$ and a melting point of 165° C. in place of PBT.

COMPARATIVE EXAMPLE 4

A two-layer, microporous polyethylene membrane was produced in the same manner as in Example 1 except for adding 2 parts by mass of calcium carbonate to 100 parts by mass of the resin composition for the second microporous membrane.

COMPARATIVE EXAMPLE 5

A microporous membrane made of the polyethylene composition was produced in the same manner as the method of producing the first microporous membrane in Example 5.

COMPARATIVE EXAMPLE 6

A microporous membrane made of the polyethylene composition and PBT was produced in the same manner as the method of producing the second microporous membrane in Example 5, except for changing the formulation to 20% by mass of UHMWPE, 70% by mass of HDPE and 10% by mass of PBT.

COMPARATIVE EXAMPLE 7

A two-layer, microporous polyethylene membrane was produced in the same manner as in Example 5 except for using PP having Mw of $5.3 \times 10^5$ and a melting point of 165° C. in place of PBT.

COMPARATIVE EXAMPLE 8

A two-layer, microporous polyethylene membrane was produced in the same manner as in Example 5 except for adding 2 parts by mass of calcium carbonate to 100 parts by mass of the resin composition for the second microporous membrane.

The properties of the (multi-layer) microporous polyethylene membranes obtained in Examples 1 to 10 and Comparative Examples 1 to 8 were measured by the following methods. The results are shown in Table 1.

(1) Average Thickness (μm)

The thickness of the (multi-layer) microporous polyethylene membrane was measured at a 5-mm interval over a width of 30 cm by a contact thickness meter, and the measured thickness was averaged.

(2) Particle Size 300 fine particles were arbitrarily selected from those observed by a transmission electron microscope (TEM) having a magnification of 3,000 times, and their particle sizes were measured and expressed by a range from the minimum (rounded to the order of μm) to the maximum (rounded to the order of μm).

(3) Air Permeability (Sec/100 cm³/20 μm)

The air permeability $P_1$ of the (multi-layer) microporous polyethylene membrane having a thickness $T_1$ was measured according to JIS P8117, and converted to air permeability $P_2$ at a thickness of 20 μm by the formula of $P_2=(P_1 \times 20)/T_1$.

(4) Porosity (%)

It was measured by a mass method.

(5) Pin Puncture Strength (mN/20 μm)

The maximum load was measured when a (multi-layer) microporous polyethylene membrane having a thickness $T_1$ was pricked with a needle of 1 mm in diameter with a spherical end surface (radius R of curvature: 0.5 mm) at a speed of 2 mm/second. The measured maximum load $L_1$ was converted to the maximum load $L_2$ at a thickness of 20 μm by the formula of $L_2=(L_1 \times 20)/T_1$, which was regarded as pin puncture strength.

(6) Tensile Rupture Strength and Tensile Rupture Elongation

They were measured using a 10-mm-wide rectangular test piece according to ASTM D882.

(7) Heat Shrinkage Ratio (%)

The shrinkage ratio of the (multi-layer) microporous polyethylene membrane after exposed to 105° C. for 8 hours was measured three times in both longitudinal direction (MD) and transverse direction (TD), and the three values obtained were averaged.

(8) Shutdown Temperature

Using a thermomechanical analyzer (TMA/SS6000 available from Seiko Instruments, Inc.), a test piece of 10 mm (TD)×3 mm (MD) was heated at a speed of 5° C./minute from room temperature while being longitudinally drawn under a load of 2 g. A temperature at an inflection point observed near the melting point was regarded as a shutdown temperature.

(9) Shutdown Speed

Each of (multi-layer) microporous membranes was heat-treated by contact with a plate controlled at 135° C. for various periods of time and then measured with respect to air permeability. A time period (second) until the air permeability reached 100,000 seconds/100 cm³ (converted to the value of 20-μm thickness) was regarded as a shutdown speed.

(10) Meltdown Temperature (° C.)

Using the above thermomechanical analyzer, a test piece of 10 mm (TD)×3 mm (MD) was heated at a speed of 5° C./minute from room temperature while being longitudinally drawn under a load of 2 g, to measure a temperature at which the test piece was ruptured by melting.

(11) Ratio of Thickness Change by Heat Compression

Each of the (multi-layer) microporous membranes of Examples 1 to 4 and Comparative Examples 1 to 4 was sandwiched by a pair of press plates each having a highly flat surface, and heat-compressed at 2.2 MPa and 90° C. for 5 minutes by a press machine to measure the thickness change, from which a thickness change ratio was calculated, assuming that the pre-compression thickness was 100%. Each of the (multi-layer) microporous membranes of Examples 5 to 10 and Comparative Examples 5 to 8 was heat-compressed in the same manner as in the (multi-layer) microporous membranes of Examples 1 to 4 except for changing the pressure to 5 MPa, and the thickness change ratio was calculated, assuming that the pre-compression thickness was 100%.

(12) Air Permeability Increase (Sec/100 cm³)

Each (multi-layer) microporous membrane heat-compressed under the above conditions was measured with respect to post-compression air permeability $P_1'$ according to JIS P8117, and the difference between the post-compression air permeability $P_1'$ and the air permeability $P_1$ before heat compression was regarded as air permeability increase.

TABLE 1

| | No. | | |
|---|---|---|---|
| | Example 1 | Example 2 | Example 3 |
| Resin Composition | | | |
| PE Resin for First Microporous Layer | | | |
| UHMWPE Mw[1]/% by mass | $2.0 \times 10^6/25$ | $2.0 \times 10^6/25$ | $2.0 \times 10^6/25$ |
| HDPE Mw[1]/% by mass | $3.5 \times 10^5/75$ | $3.5 \times 10^5/75$ | $3.5 \times 10^5/75$ |
| Resin Mixture for Second Microporous Layer | | | |
| UHMWPE Mw[1]/% by mass | $2.0 \times 10^6/25$ | $2.0 \times 10^6/25$ | $2.0 \times 10^6/25$ |
| HDPE Mw[1]/% by mass | $3.5 \times 10^5/65$ | $3.5 \times 10^5/55$ | $3.5 \times 10^5/65$ |
| Heat-resistant polymer Type | PBT[9] | PBT[9] | PBT[9] |
| Mw[1]/% by mass | $3.8 \times 10^4/10$ | $3.8 \times 10^4/20$ | $3.8 \times 10^4/10$ |
| Filler Type/% by mass[2] | —/— | —/— | —/— |
| Production Conditions | | | |
| PE Resin Concentration (% by mass)[3] | 30 | 30 | 30 |
| Resin Composition Conc. (% by mass)[4] | 30 | 30 | 30 |
| Layer Structure of Extrudate[5] | — | — | — |
| Stretching | | | |
| First Gel-Like Sheet | | | |
| Magnification (MD × TD)[6]/Temp. (° C.) | 5 × 5/117 | 5 × 5/117 | 5 × 5/117 |
| Second Gel-Like Sheet | | | |
| Magnification (MD × TD)[6]/Temp. (° C.) | 5 × 5/117 | 5 × 5/117 | 5 × 5/117 |
| Multi-Layer, Gel-Like Sheet | | | |
| Magnification (MD × TD)[6]/Temp. (° C.) | —/— | —/— | —/— |
| Lamination | | | |
| Temperature (° C.)/Pressure (MPa) | 110/0.2 | 110/0.2 | 110/0.2 |
| Layer Structure[7] | (I)/(II) | (I)/(II) | (I)/(II)/(I) |
| Re-Stretching | | | |
| Magnification (MD × TD)[6]/Temp. (° C.) | 1.6 × 1.6/110 | 1.6 × 1.6/110 | 1.6 × 1.6/110 |
| Annealing | | | |
| Temperature (° C.)/Time (minute) | 125/10 | 125/10 | 125/10 |

TABLE 1-continued

| Properties | | | |
|---|---|---|---|
| Average Thickness (μm) | 24.9 | 25.0 | 24.9 |
| Second Microporous Layer | | | |
| Relative Thickness (%)[8] | 50 | 50 | 33 |
| Particle Size (μm) | 3 to 4 | 4 to 5 | 3 to 4 |
| Air Permeability (sec/100 cm³/20 μm) | 240 | 230 | 260 |
| Porosity (%) | 49 | 50 | 47 |
| Pin Puncture Strength (g/20 μm) | 410 | 400 | 420 |
| (mN/20 μm) | 4,018 | 3,920 | 4,116 |
| Tensile Rupture Strength (kg/cm²) MD | 1,350 | 1,340 | 1,390 |
| (kPa) MD | 132,300 | 131,320 | 136,220 |
| (kg/cm²) TD | 1,250 | 1,240 | 1,280 |
| (kPa) TD | 122,500 | 121,520 | 125,440 |
| Tensile Rupture Elongation (%) MD/TD | 170/160 | 160/150 | 170/170 |
| Heat Shrinkage Ratio (%) MD/TD | 2/3 | 3/3 | 3/2 |
| Shutdown Temperature (° C.) | 135 | 135 | 135 |
| Shutdown Speed (sec) | 4 | 5 | 4 |
| Meltdown Temperature (° C.) | 172 | 172 | 170 |
| Compression Resistance | | | |
| Thickness Change Ratio (%) | −45 | −48 | −40 |
| Air Permeability Increase (sec/100 cm³) | 120 | 115 | 130 |

| | No. | | |
|---|---|---|---|
| | Example 4 | Example 5 | Example 6 |
| Resin Composition | | | |
| PE Resin for First Microporous Layer | | | |
| UHMWPE Mw[1]/% by mass | $2.0 \times 10^6$/25 | $2.0 \times 10^6$/25 | $2.0 \times 10^6$/25 |
| HDPE Mw[1]/% by mass | $3.5 \times 10^5$/75 | $5.0 \times 10^5$/75 | $5.0 \times 10^5$/75 |
| Resin Mixture for Second Microporous Layer | | | |
| UHMWPE Mw[1]/% by mass | $2.0 \times 10^6$/25 | $2.0 \times 10^6$/25 | $2.0 \times 10^6$/25 |
| HDPE Mw[1]/% by mass | $3.5 \times 10^5$/65 | $5.0 \times 10^5$/65 | $5.0 \times 10^5$/65 |
| Heat-resistant polymer Type | PBT[9] | PBT[9] | TPX[10] |
| Mw[1]/% by mass | $3.8 \times 10^4$/10 | $3.8 \times 10^4$/10 | $5.2 \times 10^5$/10 |
| Filler Type/% by mass[2] | —/— | —/— | —/— |
| Production Conditions | | | |
| PE Resin Concentration (% by mass)[3] | 30 | 30 | 30 |
| Resin Composition Conc. (% by mass)[4] | 30 | 30 | 30 |
| Layer Structure of Extrudate[5] | (I)/(II)/(I) | — | — |
| Stretching | | | |
| First Gel-Like Sheet | | | |
| Magnification (MD × TD)[6]/Temp. (° C.) | —/— | 5 × 5/117 | 5 × 5/117 |
| Second Gel-Like Sheet | | | |
| Magnification (MD × TD)[6]/Temp. (° C.) | —/— | 5 × 5/117 | 5 × 5/117 |
| Multi-Layer, Gel-Like Sheet | | | |
| Magnification (MD × TD)[6]/Temp. (° C.) | 5 × 5/117 | —/— | —/— |
| Lamination | | | |
| Temperature (° C.)/Pressure (MPa) | —/— | 110/0.2 | 110/0.2 |
| Layer Structure[7] | — | (I)/(II) | (I)/(II) |
| Re-Stretching | | | |
| Magnification (MD × TD)[6]/Temp. (° C.) | — | 1.6 × 1.6/110 | 1.6 × 1.6/110 |
| Annealing | | | |
| Temperature (° C.)/Time (minute) | 125/10 | 125/10 | 125/10 |
| Properties | | | |
| Average Thickness (μm) | 24.8 | 24.9 | 24.8 |
| Second Microporous Layer | | | |
| Relative Thickness (%)[8] | 33 | 50 | 50 |
| Particle Size (μm) | 3 to 4 | 3 to 4 | 3 to 4 |
| Air Permeability (sec/100 cm³/20 μm) | 240 | 230 | 240 |
| Porosity (%) | 48 | 49 | 48 |
| Pin Puncture Strength (g/20 μm) | 430 | 420 | 440 |
| (mN/20 μm) | 4,214 | 4,116 | 4,312 |
| Tensile Rupture Strength (kg/cm²) MD | 1,400 | 1,360 | 1,410 |
| (kPa) MD | 137,200 | 133,280 | 138,180 |

TABLE 1-continued

|  |  |  |  |  |
|---|---|---|---|---|
| (kg/cm²) TD | | 1,300 | 1,260 | 1,300 |
| (kPa) TD | | 127,400 | 123,480 | 127,400 |
| Tensile Rupture Elongation (%) MD/TD | | 180/170 | 170/160 | 160/160 |
| Heat Shrinkage Ratio (%) MD/TD | | 3/3 | 2/3 | 3/3 |
| Shutdown Temperature (° C.) | | 135 | 135 | 135 |
| Shutdown Speed (sec) | | 3 | 4 | 5 |
| Meltdown Temperature (° C.) | | 170 | 172 | 171 |
| Compression Resistance | | | | |
| Thickness Change Ratio (%) | | −41 | −45 | −44 |
| Air Permeability Increase (sec/100 cm³) | | 120 | 120 | 135 |

| | No. | | |
|---|---|---|---|
| | Example 7 | Example 8 | Example 9 |

Resin Composition

PE Resin for First Microporous Layer

| | Example 7 | Example 8 | Example 9 |
|---|---|---|---|
| UHMWPE Mw$^{(1)}$/% by mass | $2.0 \times 10^6$/25 | $2.0 \times 10^6$/25 | $2.0 \times 10^6$/25 |
| HDPE Mw$^{(1)}$/% by mass | $5.0 \times 10^5$/75 | $5.0 \times 10^5$/75 | $5.0 \times 10^5$/75 |

Resin Mixture for Second Microporous Layer

| | Example 7 | Example 8 | Example 9 |
|---|---|---|---|
| UHMWPE Mw$^{(1)}$/% by mass | $2.0 \times 10^6$/25 | $2.0 \times 10^6$/25 | $2.0 \times 10^6$/25 |
| HDPE Mw$^{(1)}$/% by mass | $5.0 \times 10^5$/65 | $5.0 \times 10^5$/65 | $5.0 \times 10^5$/65 |
| Heat-resistant polymer Type | PC$^{(11)}$ | PA6$^{(12)}$ | PBT$^{(9)}$ |
| Mw$^{(1)}$/% by mass | $3 \times 10^4$/10 | $1.1 \times 10^4$/10 | $3.8 \times 10^4$/10 |
| Filler Type/% by mass$^{(2)}$ | —/— | —/— | —/— |

Production Conditions

| | Example 7 | Example 8 | Example 9 |
|---|---|---|---|
| PE Resin Concentration (% by mass)$^{(3)}$ | 30 | 30 | 30 |
| Resin Composition Conc. (% by mass)$^{(4)}$ | 30 | 30 | 30 |
| Layer Structure of Extrudate$^{(5)}$ | — | — | — |

Stretching

First Gel-Like Sheet

| | Example 7 | Example 8 | Example 9 |
|---|---|---|---|
| Magnification (MD × TD)$^{(6)}$/Temp. (° C.) | 5 × 5/117 | 5 × 5/117 | 5 × 5/117 |

Second Gel-Like Sheet

| | Example 7 | Example 8 | Example 9 |
|---|---|---|---|
| Magnification (MD × TD)$^{(6)}$/Temp. (° C.) | 5 × 5/117 | 5 × 5/117 | 5 × 5/117 |

Multi-Layer, Gel-Like Sheet

| | Example 7 | Example 8 | Example 9 |
|---|---|---|---|
| Magnification (MD × TD)$^{(6)}$/Temp. (° C.) | —/— | —/— | —/— |

Lamination

| | Example 7 | Example 8 | Example 9 |
|---|---|---|---|
| Temperature (° C.)/Pressure (MPa) | 110/0.2 | 110/0.2 | 110/0.2 |
| Layer Structure$^{(7)}$ | (I)/(II) | (I)/(II) | (I)/(II)/(I) |

Re-Stretching

| | Example 7 | Example 8 | Example 9 |
|---|---|---|---|
| Magnification (MD × TD)$^{(6)}$/Temp. (° C.) | 1.6 × 1.6/110 | 1.6 × 1.6/110 | 1.6 × 1.6/110 |

Annealing

| | Example 7 | Example 8 | Example 9 |
|---|---|---|---|
| Temperature (° C.)/Time (minute) | 125/10 | 125/10 | 125/10 |

Properties

| | | Example 7 | Example 8 | Example 9 |
|---|---|---|---|---|
| Average Thickness (μm) | | 24.8 | 25.0 | 24.9 |
| Second Microporous Layer | | | | |
| Relative Thickness (%)$^{(8)}$ | | 50 | 50 | 33 |
| Particle Size (μm) | | 3 to 4 | 4 to 5 | 3 to 4 |
| Air Permeability (sec/100 cm³/20 μm) | | 210 | 250 | 250 |
| Porosity (%) | | 50 | 49 | 47 |
| Pin Puncture Strength | (g/20 μm) | 400 | 410 | 430 |
| | (mN/20 μm) | 3,920 | 4,018 | 4,214 |
| Tensile Rupture Strength | (kg/cm²) MD | 1,390 | 1,400 | 1,400 |
| | (kPa) MD | 136,220 | 137,200 | 137,200 |
| | (kg/cm²) TD | 1,280 | 1,270 | 1,290 |
| | (kPa) TD | 125,440 | 124,460 | 126,420 |
| Tensile Rupture Elongation (%) MD/TD | | 160/160 | 160/150 | 170/170 |
| Heat Shrinkage Ratio (%) MD/TD | | 3/3 | 3/3 | 3/2 |
| Shutdown Temperature (° C.) | | 135 | 135 | 135 |
| Shutdown Speed (sec) | | 5 | 4 | 4 |
| Meltdown Temperature (° C.) | | 171 | 172 | 170 |
| Compression Resistance | | | | |
| Thickness Change Ratio (%) | | −46 | −43 | −40 |
| Air Permeability Increase (sec/100 cm³) | | 140 | 138 | 130 |

TABLE 1-continued

|  | Example 10 | Com. Ex. 1 | Com. Ex. 2 |
|---|---|---|---|
| Resin Composition | | | |
| *PE Resin for First Microporous Layer* | | | |
| UHMWPE Mw[(1)]/% by mass | $2.0 \times 10^6$/25 | $2.0 \times 10^6$/25 | —/— |
| HDPE Mw[(1)]/% by mass | $5.0 \times 10^5$/75 | $3.5 \times 10^5$/75 | —/— |
| *Resin Mixture for Second Microporous Layer* | | | |
| UHMWPE Mw[(1)]/% by mass | $2.0 \times 10^6$/25 | —/— | $2.0 \times 10^6$/20 |
| HDPE Mw[(1)]/% by mass | $5.0 \times 10^5$/65 | —/— | $3.5 \times 10^5$/70 |
| Heat-resistant polymer Type | PBT[(9)] | — | PBT[(9)] |
| Mw[(1)]/% by mass | $3.8 \times 10^4$/10 | —/— | $3.8 \times 10^4$/10 |
| Filler Type/% by mass[(2)] | —/— | —/— | —/— |
| Production Conditions | | | |
| PE Resin Concentration (% by mass)[(3)] | 30 | 30 | — |
| Resin Composition Conc. (% by mass)[(4)] | 30 | — | 30 |
| Layer Structure of Extrudate[(5)] | (I)/(II)/(I) | — | — |
| *Stretching* | | | |
| *First Gel-Like Sheet* | | | |
| Magnification (MD × TD)[(6)]/Temp. (° C.) | —/— | 5 × 5/117 | —/— |
| *Second Gel-Like Sheet* | | | |
| Magnification (MD × TD)[(6)]/Temp. (° C.) | —/— | —/— | 5 × 5/117 |
| *Multi-Layer, Gel-Like Sheet* | | | |
| Magnification (MD × TD)[(6)]/Temp. (° C.) | 5 × 5/117 | —/— | —/— |
| *Lamination* | | | |
| Temperature (° C.)/Pressure (MPa) | —/— | —/— | —/— |
| Layer Structure[(7)] | — | — | — |
| *Re-Stretching* | | | |
| Magnification (MD × TD)[(6)]/Temp. (° C.) | —/— | —/— | —/— |
| *Annealing* | | | |
| Temperature (° C.)/Time (minute) | 125/10 | 125/10 | 125/10 |
| Properties | | | |
| Average Thickness (μm) | 24.8 | 25.0 | 24.8 |
| *Second Microporous Layer* | | | |
| Relative Thickness (%)[(8)] | 33 | — | 100 |
| Particle Size (μm) | 3 to 4 | — | 3 to 4 |
| Air Permeability (sec/100 cm³/20 μm) | 230 | 450 | 270 |
| Porosity (%) | 48 | 40 | 44 |
| Pin Puncture Strength (g/20 μm) | 440 | 490 | 350 |
| (mN/20 μm) | 4,312 | 4,802 | 3,430 |
| Tensile Rupture Strength (kg/cm²) MD | 1,410 | 1,400 | 1,200 |
| (kPa) MD | 138,180 | 137,200 | 117,600 |
| (kg/cm²) TD | 1,310 | 1,200 | 1,050 |
| (kPa) TD | 128,380 | 117,600 | 102,900 |
| Tensile Rupture Elongation (%) MD/TD | 180/170 | 145/200 | 150/170 |
| Heat Shrinkage Ratio (%) MD/TD | 3/3 | 6/4 | 4/4 |
| Shutdown Temperature (° C.) | 135 | 135 | 140 |
| Shutdown Speed (sec) | 3 | 3 | 20 |
| Meltdown Temperature (° C.) | 170 | 165 | 170 |
| *Compression Resistance* | | | |
| Thickness Change Ratio (%) | −41 | −15 | −20 |
| Air Permeability Increase (sec/100 cm³) | 120 | 1,050 | 135 |

|  | Com. Ex. 3 | Com. Ex. 4 | Com. Ex. 5 |
|---|---|---|---|
| Resin Composition | | | |
| *PE Resin for First Microporous Layer* | | | |
| UHMWPE Mw[(1)]/% by mass | $2.0 \times 10^6$/25 | $2.0 \times 10^6$/25 | $2.0 \times 10^6$/25 |
| HDPE Mw[(1)]/% by mass | $3.5 \times 10^5$/75 | $3.5 \times 10^5$/75 | $5.0 \times 10^5$/75 |

TABLE 1-continued

| Resin Mixture for Second Microporous Layer | | | |
|---|---|---|---|
| UHMWPE Mw[1]/% by mass | $2.0 \times 10^6/25$ | $2.0 \times 10^6/25$ | —/— |
| HDPE Mw[1]/% by mass | $3.5 \times 10^5/65$ | $3.5 \times 10^5/65$ | —/— |
| Heat-resistant polymer Type | PP[13] | PBT[9] | — |
| Mw[1]/% by mass | $5.3 \times 10^5/10$ | $3.8 \times 10^4/10$ | — |
| Filler Type/% by mass[2] | —/— | $CaCO_3/2$ | —/— |

Production Conditions

| | | | |
|---|---|---|---|
| PE Resin Concentration (% by mass)[3] | 30 | 30 | 30 |
| Resin Composition Conc. (% by mass)[4] | 30 | 30 | — |
| Layer Structure of Extrudate[5] | — | — | — |

Stretching
First Gel-Like Sheet

| | | | |
|---|---|---|---|
| Magnification (MD × TD)[6]/Temp. (° C.) | 5 × 5/117 | 5 × 5/117 | 5 × 5/117 |

Second Gel-Like Sheet

| | | | |
|---|---|---|---|
| Magnification (MD × TD)[6]/Temp. (° C.) | 5 × 5/117 | 5 × 5/117 | —/— |

Multi-Layer, Gel-Like Sheet

| | | | |
|---|---|---|---|
| Magnification (MD × TD)[6]/Temp. (° C.) | —/— | —/— | —/— |

Lamination

| | | | |
|---|---|---|---|
| Temperature (° C.)/Pressure (MPa) | 110/0.5 | 110/0.5 | —/— |
| Layer Structure[7] | (I)/(II) | (I)/(II) | — |

Re-Stretching

| | | | |
|---|---|---|---|
| Magnification (MD × TD)[6]/Temp. (° C.) | 1.6 × 1.6/110 | 1.6 × 1.6/110 | —/— |

Annealing

| | | | |
|---|---|---|---|
| Temperature (° C.)/Time (minute) | 125/10 | 125/10 | 125/10 |

Properties

| | | | |
|---|---|---|---|
| Average Thickness (μm) | 24.8 | 24.9 | 25.0 |

Second Microporous Layer

| | | | |
|---|---|---|---|
| Relative Thickness (%)[8] | 50 | 50 | — |
| Particle Size (μm) | — | 4 to 5 | — |
| Air Permeability (sec/100 cm³/20 μm) | 380 | 240 | 440 |
| Porosity (%) | 41 | 45 | 40 |
| Pin Puncture Strength (g/20 μm) | 340 | 350 | 500 |
| (mN/20 μm) | 3,332 | 3,430 | 4,700 |
| Tensile Rupture Strength (kg/cm²) MD | 1,250 | 1,190 | 1,410 |
| (kPa) MD | 122,500 | 116,620 | 138,180 |
| (kg/cm²) TD | 1,100 | 1,000 | 1,210 |
| (kPa) TD | 107,800 | 98,000 | 118,580 |
| Tensile Rupture Elongation (%) MD/TD | 150/170 | 130/160 | 145/200 |
| Heat Shrinkage Ratio (%) MD/TD | 4/5 | 6/6 | 6/4 |
| Shutdown Temperature (° C.) | 140 | 145 | 135 |
| Shutdown Speed (sec) | 20 | 75 | 3 |
| Meltdown Temperature (° C.) | 170 | 175 | 165 |

Compression Resistance

| | | | |
|---|---|---|---|
| Thickness Change Ratio (%) | −18 | −21 | −15 |
| Air Permeability Increase (sec/100 cm³) | 950 | 140 | 1,050 |

| | No. | | |
|---|---|---|---|
| | Com. Ex. 6 | Com. Ex. 7 | Com. Ex. 8 |

Resin Composition

PE Resin for First Microporous Layer

| | | | |
|---|---|---|---|
| UHMWPE Mw[1]/% by mass | —/— | $2.0 \times 10^6/25$ | $2.0 \times 10^6/25$ |
| HDPE Mw[1]/% by mass | —/— | $5.0 \times 10^5/75$ | $5.0 \times 10^5/75$ |

Resin Mixture for Second Microporous Layer

| | | | |
|---|---|---|---|
| UHMWPE Mw[1]/% by mass | $2.0 \times 10^6/20$ | $2.0 \times 10^6/25$ | $2.0 \times 10^6/25$ |
| HDPE Mw[1]/% by mass | $5.0 \times 10^5/70$ | $5.0 \times 10^5/65$ | $5.0 \times 10^5/65$ |
| Heat-resistant polymer Type | PBT[9] | PP[13] | PBT[9] |
| Mw[1]/% by mass | $3.8 \times 10^4/10$ | $5.3 \times 10^5/10$ | $3.8 \times 10^4/10$ |
| Filler Type/% by mass[2] | —/— | —/— | $CaCO_3/2$ |

Production Conditions

| | | | |
|---|---|---|---|
| PE Resin Concentration (% by mass)[3] | — | 30 | 30 |
| Resin Composition Conc. (% by mass)[4] | 30 | 30 | 30 |
| Layer Structure of Extrudate[5] | — | — | — |

Stretching

TABLE 1-continued

| First Gel-Like Sheet | | | |
|---|---|---|---|
| Magnification (MD × TD)[6]/Temp. (° C.) | —/— | 5 × 5/117 | 5 × 5/117 |
| Second Gel-Like Sheet | | | |
| Magnification (MD × TD)[6]/Temp. (° C.) | 5 × 5/117 | 5 × 5/117 | 5 × 5/117 |
| Multi-Layer, Gel-Like Sheet | | | |
| Magnification (MD × TD)[6]/Temp. (° C.) | —/— | —/— | —/— |
| Lamination | | | |
| Temperature (° C.)/Pressure (MPa) | —/— | 110/0.5 | 110/0.5 |
| Layer Structure[7] | — | (I)/(II) | (I)/(II) |
| Re-Stretching | | | |
| Magnification (MD × TD)[6]/Temp. (° C.) | —/— | 1.6 × 1.6/110 | 1.6 × 1.6/110 |
| Annealing | | | |
| Temperature (° C.)/Time (minute) | 125/10 | 125/10 | 125/10 |

Properties

| | | | | |
|---|---|---|---|---|
| Average Thickness (μm) | | 24.8 | 24.8 | 24.9 |
| Second Microporous Layer | | | | |
| Relative Thickness (%)[8] | | 100 | 50 | 50 |
| Particle Size (μm) | | 3 to 4 | — | 4 to 5 |
| Air Permeability (sec/100 cm³/20 μm) | | 260 | 370 | 230 |
| Porosity (%) | | 44 | 41 | 45 |
| Pin Puncture Strength | (g/20 μm) | 360 | 350 | 360 |
| | (mN/20 μm) | 3,528 | 3,430 | 3,528 |
| Tensile Rupture Strength | (kg/cm²) MD | 1,210 | 1,260 | 1,200 |
| | (kPa) MD | 118,580 | 123,480 | 117,600 |
| | (kg/cm²) TD | 1,060 | 1,110 | 1,010 |
| | (kPa) TD | 103,880 | 108,780 | 98,980 |
| Tensile Rupture Elongation (%) MD/TD | | 150/170 | 150/170 | 130/160 |
| Heat Shrinkage Ratio (%) MD/TD | | 4/4 | 4/5 | 6/6 |
| Shutdown Temperature (° C.) | | 140 | 140 | 135 |
| Shutdown Speed (sec) | | 20 | 20 | 75 |
| Meltdown Temperature (° C.) | | 170 | 170 | 175 |
| Compression Resistance | | | | |
| Thickness Change Ratio (%) | | −20 | −18 | −21 |
| Air Permeability Increase (sec/100 cm³) | | 135 | 950 | 140 |

Note:
[1] Mw represents a mass-average molecular weight.
[2] The amount of the filler based on 100% by mass of the PE composition + the heat-resistant polymer in the resin mixture for the second microporous layer.
[3] The concentration of the PE resin in the polyethylene solution for the first microporous layer.
[4] The concentration of the resin mixture in the polyethylene solution for the second microporous layer.
[5] (I) represents the first polyethylene solution, and (II) represents the second polyethylene solution.
[6] MD represents a longitudinal direction, and TD represents a transverse direction.
[7] (I) represents the first microporous membrane, and (II) represents the second microporous membrane.
[8] The ratio (%) of the thickness of the second microporous layer to the total thickness of the membrane.
[9] PBT represents polybutylene terephthalate.
[10] TPX represents the registered trademark of polymethylpentene.
[11] PC represents polycarbonate.
[12] PA6 represents polyamide 6.
[13] PP represents a propylene homopolymer.

As shown in Table 1, the multi-layer microporous polyethylene membranes of Examples 1 to 10 had well-balanced air permeability, porosity, mechanical strength, heat shrinkage resistance, shutdown properties, meltdown properties and compression resistance. Each microporous polyethylene membrane of Comparative Examples 1 and 5, which did not have the second microporous layer containing the heat-resistant polymer, had lower permeability and meltdown temperature than those of the multi-layer, microporous polyethylene membranes of Examples 1 to 10. Particularly the microporous membrane of Comparative Example 1 underwent smaller deformation when compressed and suffered larger air permeability increase by compression than the multi-layer, microporous polyethylene membranes of Examples 1 to 4. The microporous membrane of Comparative Example 5 underwent smaller deformation when compressed and suffered larger air permeability increase by compression than the multi-layer, microporous polyethylene membranes of Examples 5 to 10.

Each microporous membrane made of the polyethylene composition and PBT in Comparative Examples 2 and 6, which did not have the first microporous layer made of the polyethylene resin, had lower mechanical strength, higher shutdown temperature and a lower shutdown speed than the multi-layer, microporous polyethylene membranes of Examples 1 to 10. Particularly the microporous membrane of Comparative Example 2 underwent smaller deformation when compressed than the multi-layer, microporous polyethylene membranes of Examples 1 to 4. The microporous membrane of Comparative Example 6 underwent smaller deformation when compressed than the multi-layer, microporous polyethylene membranes of Examples 5 to 10.

Each multi-layer, microporous polyethylene membrane of Comparative Examples 3 and 7, which used PP not dispersed finely in the polyethylene resin, had lower permeability and mechanical strength, a higher shutdown temperature, and a lower shutdown speed than the multi-layer microporous polyethylene membranes of Examples 1 to 10. Particularly the microporous membrane of Comparative Example 3 underwent smaller deformation when compressed and suffered larger air permeability increase by compression than the multi-layer, microporous polyethylene membranes of Examples 1 to 4. The microporous membrane of Comparative Example 7 underwent smaller deformation when compressed and suffered larger air permeability increase by compression than the multi-layer, microporous polyethylene membranes of Examples 5 to 10.

Each multi-layer, microporous polyethylene membrane of Comparative Example 4 and 8, which contain an inorganic filler in the second microporous layer, had lower mechanical strength and a lower shutdown speed than the multi-layer, microporous polyethylene membranes of Examples 1 to 10. Particularly the microporous membrane of Comparative Example 4 had a high shutdown temperature. The microporous membrane of Comparative Example 4 underwent smaller deformation when compressed than the multi-layer, microporous polyethylene membranes of Examples 1 to 4. The microporous membrane of Comparative Example 8 underwent smaller deformation when compressed than the multi-layer, microporous polyethylene membranes of Examples 5 to 10.

EFFECT OF THE INVENTION

The multi-layer, microporous polyethylene membrane of this invention has well-balanced shutdown properties, meltdown properties, permeability, mechanical strength, heat shrinkage resistance and compression resistance. The use of such multi-layer, microporous polyethylene membrane as a separator provides batteries with not only excellent capacity properties, cycle characteristics and discharge properties, but also excellent safety properties such as heat resistance and compression resistance, and productivity.

What is claimed is:

1. A multi-layer, microporous polyethylene membrane having a three-layer structure comprising a first microporous layer constituting two surface layers and a second microporous layer sandwiched between the two surface layers, wherein the first microporous layer being made of a polyethylene resin, which is a mixture of ultra-high-molecular-weight polyethylene having a mass-average molecular weight of $1 \times 10^6$ to $15 \times 10^6$ and high-density polyethylene, and the second microporous layer being made of a mixture of the polyethylene resin and a heat-resistant resin other than polypropylene, the heat-resistant resin having a melting point or a glass transition temperature of 180° C. to 260° C. and being dispersed in the form of fine particles in the polyethylene resin, and the second microporous layer having pores containing fine particles of the heat-resistant resin as nuclei from which the cleavage of polyethylene resin fibrils starts.

2. The multi-layer, microporous polyethylene membrane according to claim 1, which has (1) a shutdown temperature of 135° C. or lower, which is a temperature at an inflection point near the melting point of the thermomechanical analysis (TMA) curve of the a test piece of 10 mm ×3 mm while being heated at a temperature-elevating speed of 5° C/minute and being longitudinally drawn under a load of 2 g, (2) a shutdown speed of 10 seconds or less, which is a time period until the air permeability measured while heating at a temperature of 135° C. reaches $1 \times 10^5$ sec/100 cm$^3$, and (3) a thickness change ratio of 30% or more and air permeability increase of 500 seconds/100 cm$^3$ or less both measured by heat compression at a temperature of 90° C. and a pressure of 2.2 to 5 MPa for 5 minutes.

3. A battery separator formed by the multi-layer, microporous polyethylene membrane recited in claim 1.

4. A battery comprising a battery separator formed by the multi-layer, microporous polyethylene membrane recited in claim 1.

5. The multi-layer, microporous polyethylene membrane according to claim 1, wherein the heat-resistant resin is polybutylene terephthalate, polycarbonate, polymethylpentene or a polyamide.

* * * * *